(12) United States Patent
McClellan

(10) Patent No.: US 10,137,745 B2
(45) Date of Patent: Nov. 27, 2018

(54) SYSTEM AND METHOD FOR MAINTAINING TARGET PRESSURE IN CONJUNCTION WITH GRAVITY-DRIVEN AUTOMATIC TIRE PUMPING MECHANISMS

(71) Applicant: INTELLIAIRE, LLC, Park City, UT (US)

(72) Inventor: Scott McClellan, Park City, UT (US)

(73) Assignee: INTELLIAIRE, LLC, Park City, UT (US)

( * ) Notice: Subject to any disclaimer, the term of this patent is extended or adjusted under 35 U.S.C. 154(b) by 118 days.

(21) Appl. No.: 15/210,723

(22) Filed: Jul. 14, 2016

(65) Prior Publication Data

US 2017/0015147 A1      Jan. 19, 2017

Related U.S. Application Data

(60) Provisional application No. 62/192,337, filed on Jul. 14, 2015.

(51) Int. Cl.
| | |
|---|---|
| *B60C 23/00* | (2006.01) |
| *B60C 23/04* | (2006.01) |
| *B60C 23/12* | (2006.01) |
| *H02K 7/18* | (2006.01) |
| *H02K 15/14* | (2006.01) |

(Continued)

(52) U.S. Cl.
CPC ............. *B60C 23/12* (2013.01); *B60B 21/12* (2013.01); *B60C 23/003* (2013.01); *B60C 23/0408* (2013.01); *H02K 7/06* (2013.01); *H02K 7/1846* (2013.01); *H02K 7/1876* (2013.01); *H02K 15/14* (2013.01); *B60C 23/06* (2013.01); *B60C 29/02* (2013.01)

(58) Field of Classification Search
None
See application file for complete search history.

(56) References Cited

U.S. PATENT DOCUMENTS 5,180,456 A * 1/1993 Schultz ................. B60C 23/003
141/1
5,409,049 A    4/1995 Renier
(Continued)

FOREIGN PATENT DOCUMENTS

EP        0855294 A2    7/1998
WO     2010141638 A1   12/2010

*Primary Examiner* — Kevin P Mahne

(57) ABSTRACT

Disclosed herein are systems, methods, and computer-readable storage media for gravity-driven pumps, gravity-driven power generators that power electric pumps, as well as various supporting concepts, mechanisms, and approaches. As a tire rotates around an axle, the pull of gravity varies for a given point on the tire. While gravity is always pulling 'down', the force relative to a fixed point on the tire changes. Gravity-driven pumps exploit these changes in gravitational force to do work. Automatic, gravity-driven pumps can be used to inflate tires to offset the natural gas leakage of modern tires, and can maintain tire pressure and inflation within a desired or optimal range. As different conditions are met, pump parameters are determined which can adjust the pumps. Such conditions include driving patterns, load, and temperature, and resulting adjustments include turning on and off pumps, varying stroke length, and varying the number of strokes required.

18 Claims, 13 Drawing Sheets

(51) Int. Cl.
*B60B 21/12* (2006.01)
*H02K 7/06* (2006.01)
*B60C 23/06* (2006.01)
*B60C 29/02* (2006.01)

(56) References Cited

U.S. PATENT DOCUMENTS

| | | | | |
|---|---|---|---|---|
| 2004/0007302 A1* | 1/2004 | Hamilton | ............... | B60C 23/12 152/416 |
| 2008/0066533 A1* | 3/2008 | Beverly | ............... | B60C 23/002 73/146 |
| 2008/0135151 A1* | 6/2008 | Loewe | ............... | B60C 23/004 152/419 |
| 2008/0156406 A1* | 7/2008 | Breed | ............... | B60C 23/041 152/415 |

* cited by examiner

SYSTEM AND METHOD FOR MAINTAINING TARGET PRESSURE IN CONJUNCTION WITH GRAVITY-DRIVEN AUTOMATIC TIRE PUMPING MECHANISMS

PRIORITY INFORMATION

The present application claims priority to U.S. provisional patent application 62/192,337, filed Jul. 14, 2015, the content of which is incorporated herein by reference in its entirety.

BACKGROUND

1. Technical Field

The present disclosure relates to automatic pumps for tires and more specifically to pumps that use changes in orientation due to tire rotation and gravitational force to drive pumps to automatically inflate tires.

2. Introduction

Tires are a critical part of modern transportation. However, proper tire inflation is an important factor in the safety, efficiency and cost of using tires. Neither underinflation nor overinflation is an optimal condition for tire longevity or safety. Overinflation can lead to unsafe wear patterns, lower traction and increased potential for a catastrophic failure or blowout of the tire during otherwise normal operation. Underinflation lowers the fuel efficiency of tires, increases wear, lowers the tire sidewall (lateral) stiffness making the tire less safe and increases the potential for catastrophic failure or blowout of the tire during otherwise normal operation. All rubber-based, modern tires lose some amount of gas due to the natural porosity of rubber. These porosity losses can be minimized by using larger air molecules (Nitrogen) than air. However, the porosity losses are only reduced, not eliminated.

Temperature can also affect tire inflation. Under higher temperatures, the tire pressure increases, while under lower temperatures, the tire pressure decreases. One solution is for users to manually check tire inflation periodically, but this is a difficult task, requires training and significant user time. Further, some portion of the user population will never check their tire inflation due to inconvenience, regardless of the benefits that proper inflation provide. Tire inflation is a problem that many drivers do not care enough about to invest the time to check or correct until the problem is so bad that the tire, and consequently the vehicle, become undrivable, or unsafe. An automatic approach to tire inflation that does not require end-users, i.e. the drivers of these vehicles, to spend time and effort would be significantly preferable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein use gravity-driven pumps to automatically inflate tires in a way that offsets the loss of gas from inside the tire. The gravity-driven pumps are mounted to the tire rim, and are activated to pump air by exploiting gravity at various orientations as the tire rotates. Different types of pumps are described herein. Further, the differences in gravity can be used to generate electricity using similar principles. This electricity can be used to power various sensors, a processor, wired or wireless communications interfaces, electronic storage, or even an electric pump instead of a gravity-driven pump.

Various parameters of the pumps can be used to better take advantage of different driving patterns and conditions. The pump parameters can be adjusted automatically or manually, can be adjusted by engaging different sets of pumps having different pump parameters, or can be adjusted by installing in tires purpose-specific pumps selected from a range of pumps.

An example system includes a pump fixedly attached to a target tire. This can be achieved for example by fixing the pump to a tire rim, which, when the tire is later attached, the tire becomes fixedly attached to the pump. The system can include a processor and a computer-readable storage medium that stores instructions which, when executed by the processor, cause the processor to perform operations including receiving (1) data associated with one of usage data and sensor data and (2) tire data for the target tire. For example, the pump may include a small computer device, a communication system and controls for receiving performance parameters that are used for adjusting the desired level of inflation, which can change based on different conditions and loads. The operations can include determining, based on the data, a range of pump parameters that will provide a desired inflation level for the target tire according to the tire data and adjusting the pump according to the pump parameters, such that rotational motion of the target tire about an axis causes gravity to move an element in a first direction at a first rotational position to yield a first stroke, and causes gravity to move the element in a second direction at a second rotational position to yield a second stroke.

The first stroke and the second stroke perform one of (1) pumping a gas into the target tire to the desired inflation level and (2) generating electricity to electrically power the pump the pump the gas into the target tire. The data can include at least one of driving data, recorded driving patterns, anticipated driving patterns, a driving category, a driving style, a personalized driving profile, a terrain, a maximum speed, how often the tires stop and start rolling, and acceleration data. The pump can be adjusted according to the pump parameters dynamically, prior to installation on the target tire, at a time of installation on the target tire, or after installation on the target tire. The pump parameter can be adjusted to alter its performance by modifying at least one of a mass of the element, a stroke length, a direction of the pump, a pump width, pump resistance, or pump position on the target tire.

Further, the pump can include a plurality of masses (on one pump or a mass on each of a plurality of separate pumps together meaning "the pump"), and wherein the pump is adjusted by fixing one or more masses of the plurality of masses in place preventing the one or more masses from moving as part of the first stroke or the second stroke.

The pump can also be one of (1) a gravity-based pump that physically moves air based on the rotation of the tire, (2) an electrical pump that generates electricity based on tire rotation and (3) a ferrofluid-based pump that generates electricity.

Other concepts disclosed herein also relate to a heterogeneous set of pumps, dynamically adjusting tire pressure based on other factors such as load (long-haul trucking, mining, constructions, private passenger auto, can all have different loads and requirements), and pumping using electronics and/or sensors.

DETAILED DESCRIPTION

Figure 1:
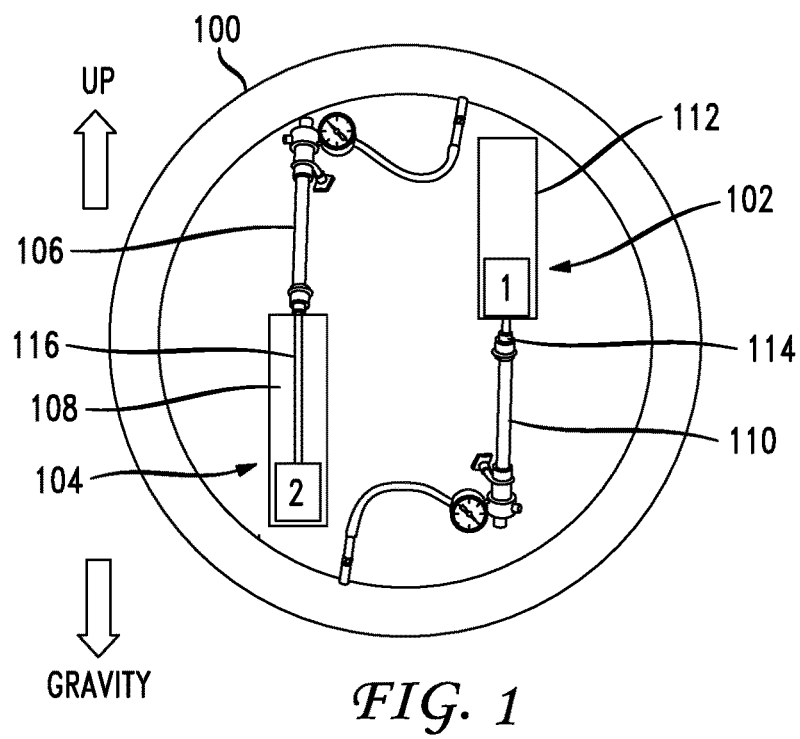
FIG. 1 illustrates an example tire with gravity-driven pumps.

A system, method and computer-readable media are disclosed for gravity-driven pumps, as well as various supporting concepts, mechanisms, and approaches. It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

Given that the present disclosure utilizes gravity as a mechanism for automatically pumping a tire, we begin with a brief discussion of the properties of gravity. Gravity has a property of an ever-present acceleration and is related to the size and density of a planet or large body generating the gravity. On earth, the gravitational acceleration is about 9.8 m/s$^2$ or 32.2 ft/s$^2$. The gravitational potential energy (U) is related to the product of the mass, gravitational acceleration and height above the surface that the mass is raised according to the equation:

$$U = mgh$$

where:
U is gravitational potential energy,
m is mass,
g is the surface value of gravity, and
h is the height above the surface (for surface calculations and small distances above the surface of the gravity generating body).

The more general, integral form of defining gravity is as follows:

$$U(r) = -\int_{\infty}^{r} \frac{-GMm}{r'^2} dr' = -\frac{GMm}{r}$$

where:
U(r) is the gravitational potential energy as a function of the distance between the bodies;
G is the gravitational constant;
M is the Mass of the attracting body;
m is the mass of the body gravity is acting upon; and
r is the distance between their centers.

Harnessing gravity or gravitational energy to perform useful work is not new: hydroelectric dams, siphons, mass pulley systems, are a few examples. In this application, we use gravity to move a mass within a chamber, which moves air from one chamber to another (in this case, moving air into a tire.). By changing the orientation of the chamber, we use gravity to create the pump stroke and intake stroke. As the tire rotates around an axle, the magnitude of the gravitational vector component varies for a given tangent on the circumference of the tire. While gravity is always pulling 'down', the force relative to a fixed tangent on the tire changes. The tangents on a circle, at 12:00 and 6:00 are parallel to each other and are horizontal in a normal, earth reference frame. The gravitational vector component is perpendicular to the tangents at 12:00 and 6:00 or pointing vertically down. In our application, at 12:00 and 6:00, gravity cannot do any constructive work due to the fact that the gravitational vector is perpendicular to the orientation of our pumping mechanism. However, the tangents on a circle at 3:00 and 9:00 are parallel with each other and are parallel with the gravitational vector. At the 3:00 and 9:00 orientations, in this application, one can utilize the full effect of gravity (the gravitational potential energy) to do constructive work. Gravity-driven pumps exploit changes in their orientation to utilize the gravitational force vector's vertical component to do work. The work can be driving a pump, or generating electrical power to drive an electric pump or other electrical components such as sensors, wireless communication devices, computing devices, or other components. A gravity-driven pump is different from an automatic pump that operates using centrifugal force due to rotation of a tire. Centrifugal force applies to virtually any rotating mass, whereas a gravity-driven pump would work when the rotational direction would cause some change in orientation of the pumping device, utilizing gravitational force to pull a pumping element in opposite directions at different rotational positions. Automatic, gravity-driven pumps can be used to inflate tires to offset the natural gas leakage of modern tires, and/or can maintain tire pressure and inflation within a designed and desired range. In one aspect, the mass can be used both to drive a pump and to generate electricity for various devices.

FIG. 1 illustrates an example tire 100 with gravity-driven pumps 102, 104. FIG. 1 illustrates the up direction which is the opposite of the pull of gravity. These example gravity-driven pumps are illustrated as large pumps for ease of demonstration, and are not necessarily to scale. The pumps 102, 104 can be much smaller, and can be embedded on or in the rim. The pumps 102, 104 can be aligned substantially parallel to the rim of the tire 100, or perpendicular to a radial line from the center of the rim to the location of the pump. These pumps have external moving parts, also for ease of demonstration, but gravity-driven pumps can include a housing within which all the moving parts are housed. In this way, the gravity-driven pump can be a modular unit. In one example, pump 102 has a chamber 112 in which a pump head "1" is configured to slide along an axis in the chamber 112. The head 1 is attached to a pump shaft 114 which moves in and out of a pressure chamber 110 of pump 102. Similar pump head "2", chamber 108, shaft 116 and pressure chamber 106 are also shown for pump 104. The basic pump structure is known and incorporated herein as included within the description of pumps 102, 104. The series of FIGS. 2A-2F show the example tire 100 at different times (or rotational positions) $T_0$-$T_5$ to illustrate how gravitational changes due to rotation cause the pumps 102, 104 to operate.

The element, or pump head, can be a piston that moves in a pump stroke in such a way as to move air from one chamber into another chamber. Moving air from one chamber to another chamber results in one of pumping air into the volumetric chamber or pumping air out of the volumetric chamber. The pump element can also move in such a way as to generate electricity which is stored in a storage device. The pump element can also be a non-solid mass that presses against a diaphragm. A system can also include a plurality of pumps. Each pump of the plurality of pumps can be positioned with an equal angular distance between other pumps of the plurality of pumps, resulting in a balancing of the plurality of pumps.

The pumping element at a rotational speed above a speed (such as 5 miles per hour) can settle into a position that aids in balancing the volumetric container. Of course the particular speed at which a pumping element can settle into a balanced position can range based on the configuration of the overall system. The plurality of pumps can be positioned so that the tire rim and the volumetric chamber are rotationally balanced. This effect provides an additional benefit to the use of the gravitational pump system disclosed herein. Because the pump element(s) move relative to the gravitational force, they can also be used to automatically balance a tire at higher rotational speeds.

The pump can also include a pressure sensitive valve that diverts the gas from the pump into the volumetric chamber when pressure inside the volumetric chamber is below a threshold, and diverts the gas from the pump away from the volumetric chamber when pressure inside the when it is at or above the threshold. As an example, a pressure sensitive valve can divert gas from the pump into the volumetric chamber when the pressure of the volumetric chamber is below 32 psi, and away from the volumetric chamber when the pressure of the volumetric chamber is at or above 32 psi. Similarly, pumps can be enabled or disabled as needed. For example, if a short-stroke pump is needed, the system can enable the short-stroke pump while disabling a long-stroke pump. Such enabling/disabling of the pumps can make use of additional mechanisms or electronics to hold mass in place and/or to disengage the pump's air path into the tire.

Figure 2A:
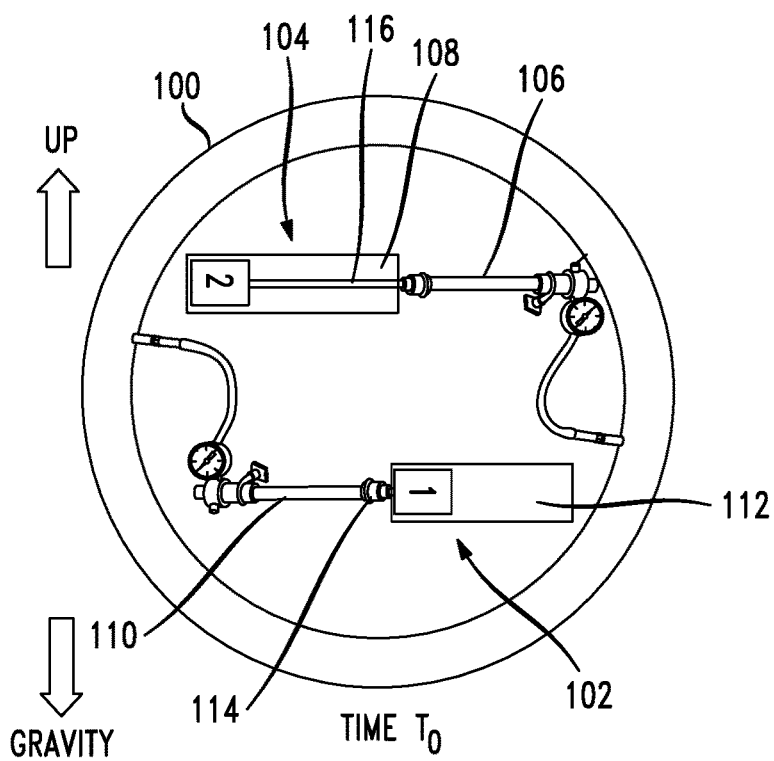
FIG. 2A illustrates the example tire with gravity-driven pumps at time $T_0$.
Figure 2B:
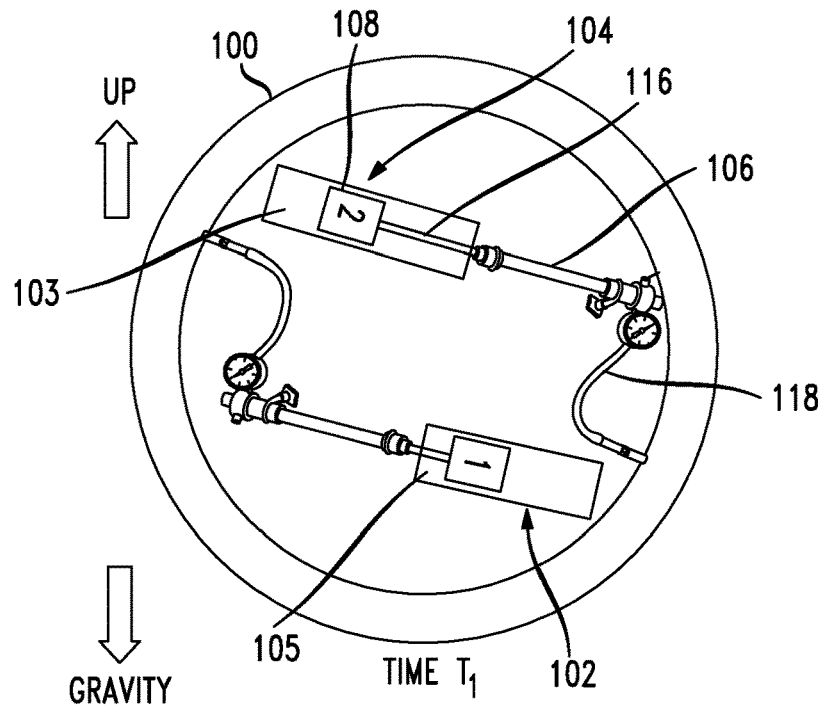
FIG. 2B illustrates the example tire with gravity-driven pumps at time $T_1$.

FIG. 2A illustrates the example tire 100 with gravity-driven pumps 102, 104 at time $T_0$. At this time, both pumps 102, 104 are parallel to the surface of the Earth, and perpendicular to the pull of gravity, so neither pump is affected. The tire rotates in a clockwise direction from time $T_0$ to time $T_1$, as shown in FIG. 2B. FIG. 2B illustrates the example tire 100 with gravity-driven pumps 102, 104 at time $T_1$. The gravity-driven pumps 102, 104 are now slightly off from parallel to the surface of the Earth, so gravity is starting to affect them. The head 1 of pump 102 is being pulled down causing a space 105 to exist in the chamber 108, and causing movement of the pump shaft 116 along the pressure chamber 106. The movement of the pump shaft 116 through the pressure chamber 106 causes air to be pumped through the hose 118 (or other mechanism) into the volume or volumetric container 100, which can be a tire.

Figure 2C:
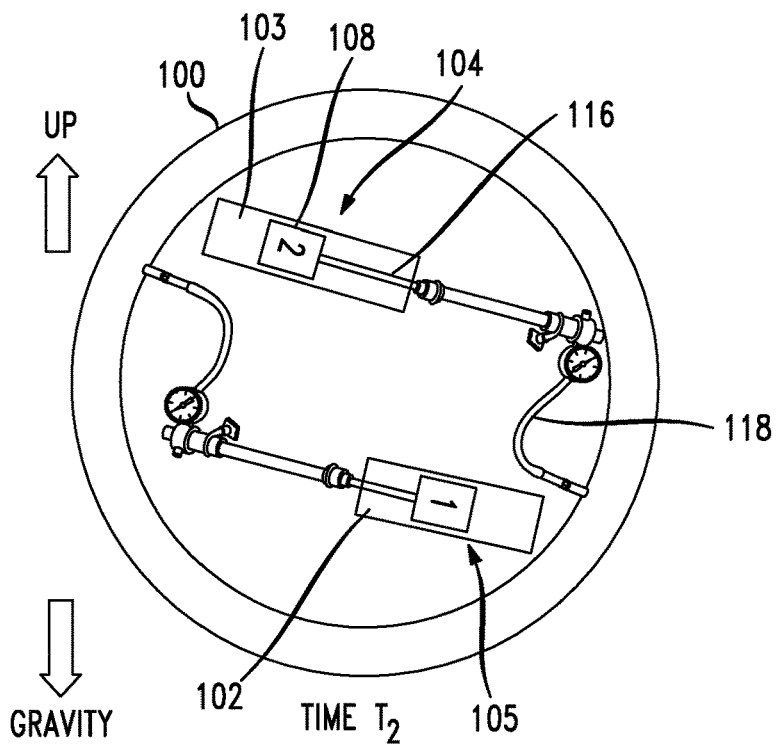
FIG. 2C illustrates the example tire with gravity-driven pumps at time $T_2$.
Figure 2D:
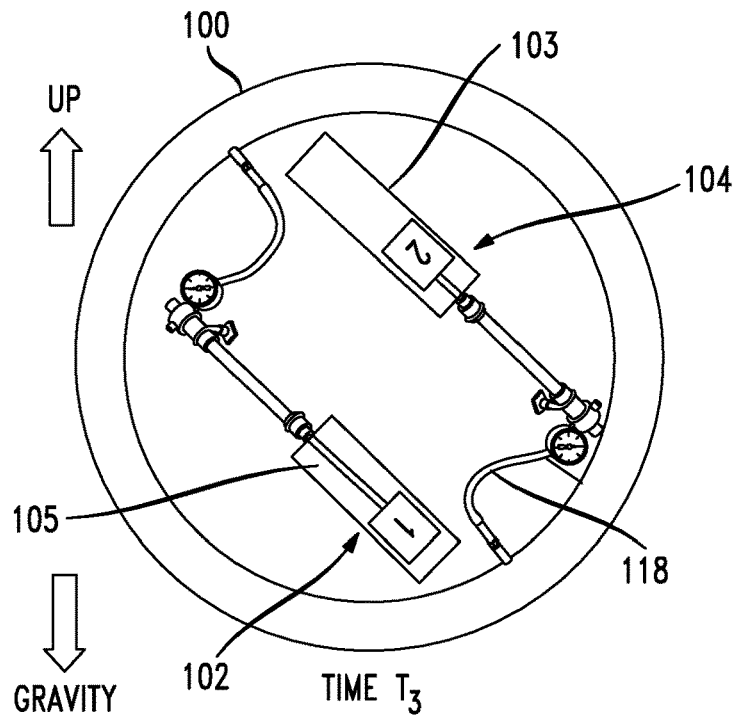
FIG. 2D illustrates the example tire with gravity-driven pumps at time $T_3$.
Figure 2E:
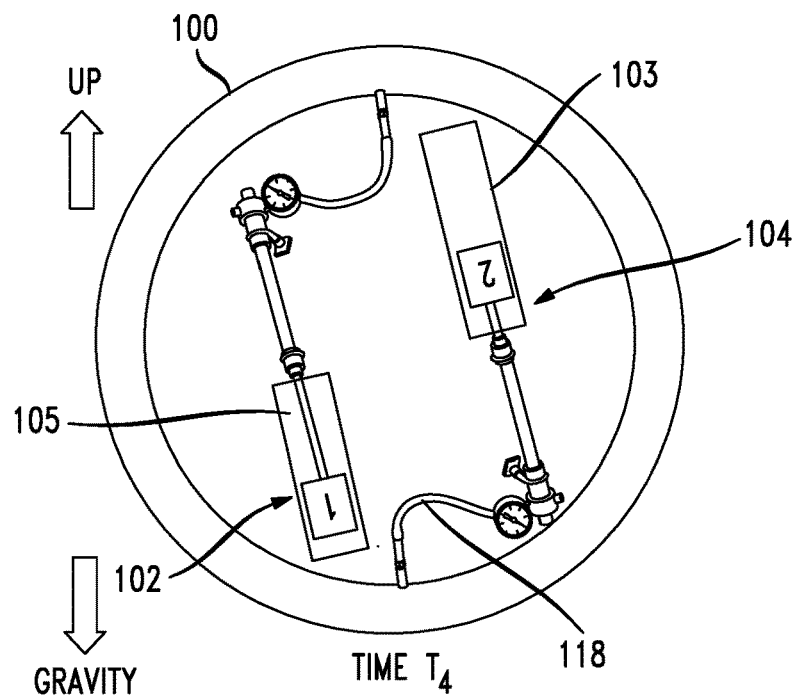
FIG. 2E illustrates the example tire with gravity-driven pumps at time $T_4$.
Figure 2F:
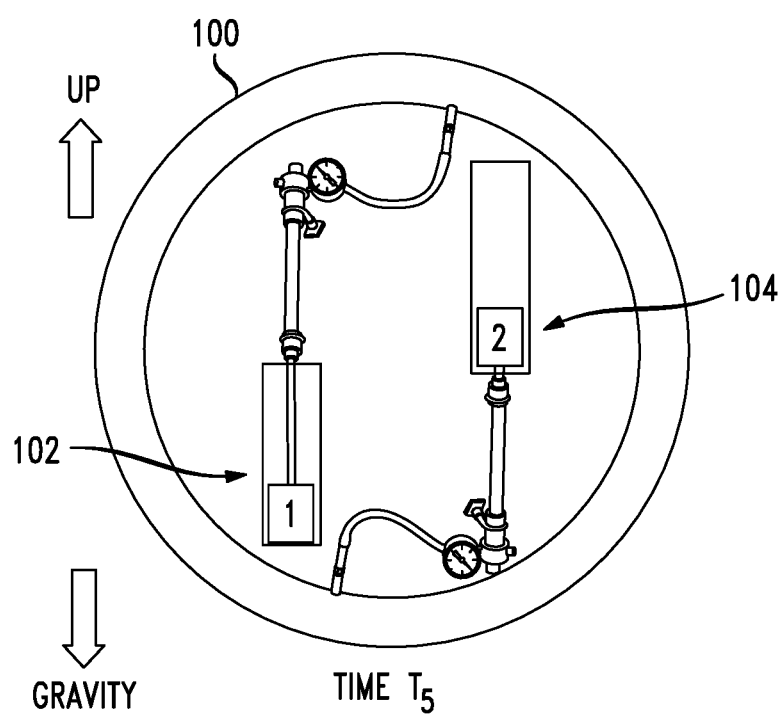
FIG. 2F illustrates the example tire with gravity-driven pumps at time $T_5$.

While pump 108 is starting the pump air into the volume 100, pump 102 in FIG. 2B at time $T_1$ is starting to extract air from the atmosphere into the pump shaft, while pump 104 is starting to compress and inject air from the pump shaft into the volume 100. The tire rotates from time $T_1$ to time $T_2$, as shown in FIG. 2C. FIG. 2C illustrates the example tire 100 with gravity-driven pumps 102, 104 at time $T_2$. The rotation has caused gravity to continue to pull on the pumps at different angles, so the pump stroke in on pump 104 and the pump stroke out on pump 102 continue and may even accelerate. The tire rotates from time $T_2$ to time $T_3$, as shown in FIG. 2D. FIG. 2D illustrates the example tire 100 with gravity-driven pumps 102, 104 at time $T_3$. The tire rotates from time $T_3$ to time $T_4$, as shown in FIG. 2E. FIG. 2E illustrates the example tire 100 with gravity-driven pumps 102, 104 at time $T_4$. The pump strokes are almost complete, as shown by the pump head 1 of pump 104 being almost completely inserted within the pump shaft, while the pump head 2 of pump 102 is almost completely extended from the pump shaft. The tire rotates from time $T_4$ to time $T_5$, as shown in FIG. 2F. FIG. 2F illustrates the example tire 100 with gravity-driven pumps 102, 104 at time $T_5$. At this point, the pump head of pump 102 is completely extended, and the pump head of pump 104 is completely inserted. As the tire continues to rotate in this direction, the roles of the pumps will reverse, so that gravity will cause pump 102 to be inserted and thus pumping air into the tire 100, and cause pump 104 to be extended and thus drawing air into the chamber for pumping. For each complete rotation of the tire at appropriate speeds, based on the tire and pump characteristics, each pump undergoes an insert stroke and an extend stroke.

The example of FIGS. 2A-2F illustrates an example of a tire at a relatively slow speed. Depending on the pump characteristics, a certain speed threshold exists, above which the tire will rotate too quickly to allow the pumps to operate. For example, the changes in orientation due to the rotation of the tire may be too fast to allow the pumps to move. If the pumps are positioned across from each other, the movement of the pumps will cancel each other out so the tire remains harmonically balanced.

Figure 3B:
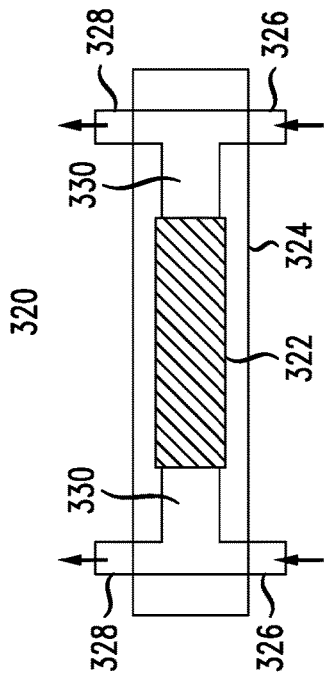
FIG. 3B illustrates an example two-way gravity-driven pump.
Figure 3D:
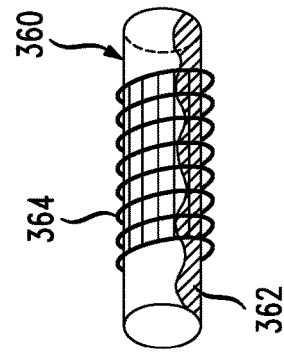
FIG. 3D illustrates an example ferritic fluid gravity-driven electricity generator.
Figure 3A:
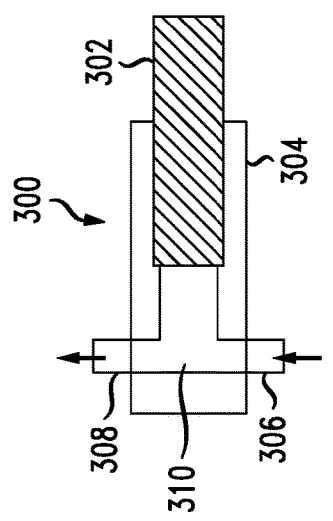
FIG. 3A illustrates an example one-way gravity-driven pump.

FIG. 3A illustrates an example one-way gravity-driven pump 300. The pump 300 includes a mass 302 that moves back and forth partially or entirely within a cylinder 304, to create an interior cavity 310. The interior cavity 310 connects with an intake valve 306 that allows gas into the interior cavity 310 as the mass 302 creates a vacuum by moving away from the interior cavity 310. The interior cavity 310 connects with an outlet valve 308 that allows air to move out of the interior cavity 310 as the mass 302 moves toward the interior cavity 310 and compresses the air therein. The air moving out of the cavity can be pumped into a tire, for example.

FIG. 3B illustrates an example two-way gravity-driven pump 320. This can allow both strokes of the pump 320 to do work. The pump 320 includes a mass 322 that moves back and forth within a cylinder 324, to create two interior cavities 330. Each interior cavity 330 connects with an intake valve 326 that allows gas into a respective interior cavity 330 as the mass 322 creates a vacuum by moving away from one interior cavity to the other. Each interior cavity 330 connects with an outlet valve 328 that allows air to move out of the interior cavity 330 as the mass 322 moves toward that interior cavity 330 and compresses the air therein. The air moving out of the cavity can be pumped into a tire, for example.

Figure 3C:
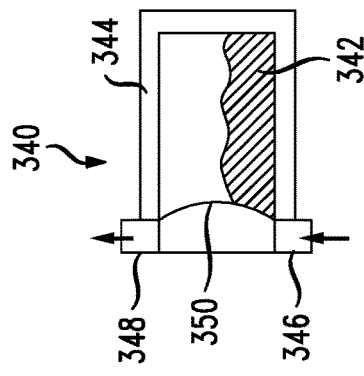
FIG. 3C illustrates an example membrane and fluid based gravity-driven pump.

FIG. 3C illustrates an example membrane and fluid based gravity-driven pump 340. In this example, the mass 342 is a liquid. As gravity acts on the liquid mass 342 in a chamber 344, the mass can press against a membrane 350. The membrane 350 can depress or deform due to the weight of the liquid mass 342, causing air in a cavity behind the membrane 350 to compress and leave through the outlet valve 348. Then, as the liquid mass 342 moves away from the membrane 350, the membrane 350 can return to its original shape, causing a vacuum in the cavity, so air enters via the intake valve 346. The cycles of gravitational pull during rotation of a tire can cause the fluctuations and movement of the liquid mass 342.

FIG. 3D illustrates an example ferritic fluid (Ferrofluid) gravity-driven electricity generator. A tube can contain a semi-viscous fluid (SVF) with magnetic or ferrite particles distributed within the fluid and/or a magneto-rheological fluid. An electrical wire mesh sleeve 364 can surround all or part of the tube 360. The tube is mounted to part of a wheel, such as a rim. As the wheel turns, the SVF within the tube rotates slower than the wheel speed, and the ferrite particles passing through the wire mesh 364 around the tube 360 produce a charge that can be harnessed to do work, such as driving an electrical pneumatic pump. In this example, a cylinder 360 (or other shaped container) contains the ferritic fluid 362 with magnetic particles. A mesh of wires 364 can surround all or part of the cylinder 360. This generator can be affixed to a tire, and, as the tire rotates, the ferritic fluid 362 will move or slosh around inside the cylinder 360. This flow of the ferritic fluid 362 through the mesh 364 causes variations in the magnetic flux that are harnessed to generate electricity in the mesh 364. The electricity can then be directed to a battery, capacitor, or other energy storage device, or can power electrical components directly, such as sensors, a processor, wireless communications interfaces, an electric pump, and so forth. The ferritic fluid 362 and mesh 364 can be a curved cylinder that runs along part of a tire rim, or around an entire tire rim, for example.

Figure 3F:
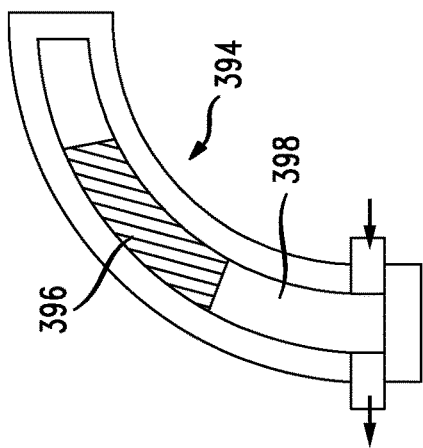
FIG. 3F illustrates an example gravity-driven pump with a curved pump path.
Figure 3E:
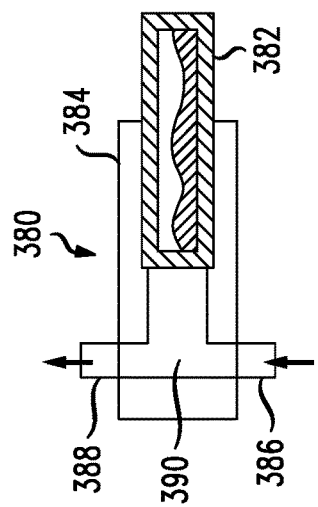
FIG. 3E illustrates a combined gravity-driven pump including internal ferritic fluid.

FIG. 3E illustrates a combined gravity-driven pump including internal ferritic fluid. In this example, as in FIG. 3A, the pump 380 includes a mass 382 that moves back and forth partially or entirely within a cylinder 384, to create an interior cavity 390. The interior cavity 390 connects with an intake valve 386 that allows gas into the interior cavity 390 as the mass 382 creates a vacuum by moving away from the interior cavity 390. The interior cavity 390 connects with an outlet valve 388 that allows air to move out of the interior cavity 390 as the mass 382 moves toward the interior cavity 390 and compresses the air therein. The air moving out of the cavity 390 can be pumped into a tire, for example. However, in FIG. 3E, the mass 382 is hollow and contains a ferritic fluid. As the mass 382 moves and as the tire rotates, the ferritic fluid sloshes around and causes a magnetic flux, which can be harnessed by a mesh of wires (not shown) embedded in the mass 382, in the wall of the cylinder 384, or outside the cylinder 384. Thus, this pump 380 can not only pump air into a tire, but can also simultaneously generate electricity while the tire is moving.

FIG. 3F illustrates an example gravity-driven pump 394 with a curved pump path. In this example, the mass 396 is curved to fit a curved cylinder path 398. The curvature of the pump path can match the rim of a tire, or can have some other curvature. The drop path of the cylinder can be an arc, linear, inverse arc, or can be an arc greater than or less than the arc defined by the radius of the rim. The various examples of pump variations in FIGS. 3A-3F can be combined in various ways not explicitly shown herein. For example, the hollow mass and internal ferritic fluid of FIG. 3E can be combined with the curved pump path of FIG. 3F and the dual cavities of FIG. 3B. As another example, the diaphragm of FIG. 3C can be combined with the ferritic fluid and mesh of FIG. 3D. In each case, the pump operates based on changes in gravity as the pump rotates about an axis, such as a pump affixed to a tire rim that rotates about the tire axle. Changes in gravity cause the mass or the liquid to move back and forth.

Specifically, the energy into the system is provided by the rotation of the wheel or tire, presumably (in the vehicle example) as the vehicle moves from point A to point B. As the wheel rotates, the orientation of the pumping device changes which enables the device to utilize gravity, or the acceleration vector, to do work in different directions. Since changing the gravitational vector is not possible, we change the orientation of the pumping device to facilitate a repeated cycle. In this pneumatic pumping device application, we orient the pump vertically upward, in such a way to use gravity to provide an intake stroke. The pump is then rotated 180°, or vertically down, and gravity is used to provide a compression stroke. This cycle can be repeated indefinitely provided that the wheel continues to rotate.

The placement and the counteracting motions of pumps can provide automatically harmonically balanced tires. At low speeds, the mass may move to do work (thereby pumping air), but at greater speeds the mass may move or may not have a chance or sufficient time to move, so the additional masses from the pumps do not cause an imbalance in the tire.

In each of these examples, the pumps can pump gas, such as air, directly into a tire, or can pump gas into a reservoir or container of compressed air (not shown). For example, if the tire is already inflated to its proper pressure, the pump can fill the reservoir or container to store air under pressure for inflating the tire at a later time, or for some other purpose.

Figure 3G:
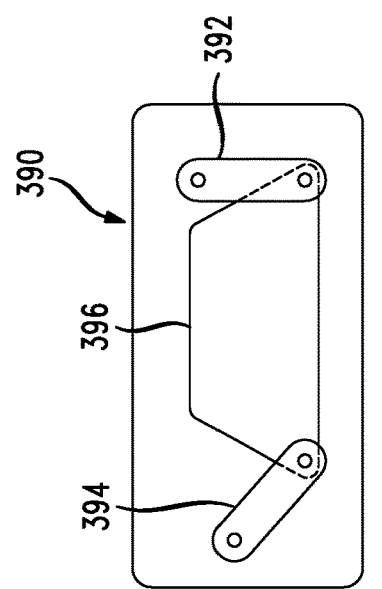
FIG. 3G illustrates different structure for a gravity-driven pump.

FIG. 3G illustrates another structure for a gravity-driven pump. Member 394 and member 392 are both rotatably attached to portions of a fixed surface. The lower portion of these members 392, 394 are each attached to a weight or pump member 396. Just as pump members "1" and "2" of FIGS. 1 and 2A-2F move as the wheel rotates to cause the pumping and intake strokes, the pump member 396 will move as the pump 390 rotates around a wheel. The pump member 396 can be attached to a piston, shaft or other member such that as the member 396 moves from one position to the other due to gravity, pumping and intake strokes occur. FIG. 3G illustrates that alternate pump structures can be used in connection with a wheel and volumetric container for air to maintain a certain pressure in the container.

Figure 4:
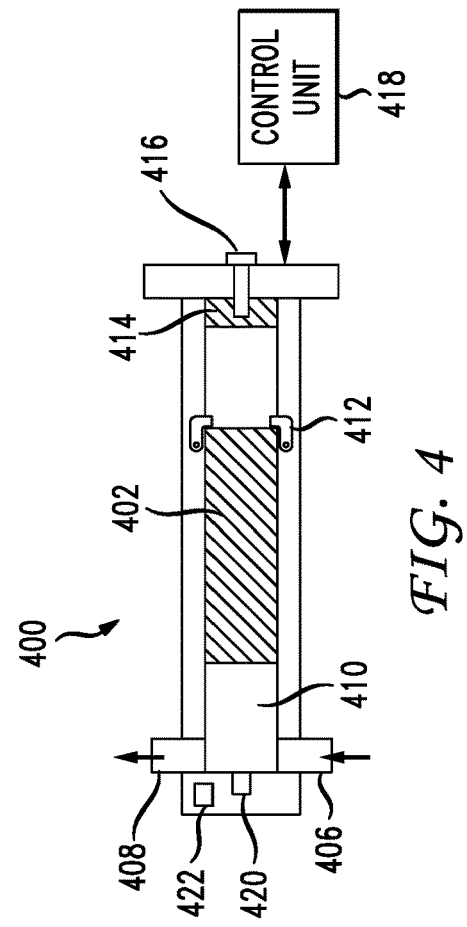
FIG. 4 illustrates an example gravity-driven pump with adjustable parameters and sensors.

FIG. 4 illustrates an example gravity-driven pump 400 with adjustable parameters and sensors. The pump 400 includes a mass 402 that moves back and forth partially or entirely within a cylinder, to create an interior cavity 410. The interior cavity 410 connects with an intake valve 406 that allows gas into the interior cavity 410 as the mass 402 creates a vacuum by moving away from the interior cavity 410. The interior cavity 410 connects with an outlet valve 408 that allows air to move out of the interior cavity 410 as the mass 402 moves toward the interior cavity 410 and compresses the air therein. The air moving out of the cavity can be pumped into a tire, for example, as in FIG. 3A. The mass 402 can typically move freely for the entire length of the cylinder, to create a long stroke. However, under certain tire rotation, driving, or road conditions, a stroke of a different length may be optimal. This example pump 400 includes latches 412 which can be operated via a control unit 418 to engage or disengage to modify the stroke length of the mass 402. For example, when latches 412 are engaged, the stroke length is shorter, and when latches 412 are disengaged, the stroke length is longer. A series of latches or a dynamically adjustable latching mechanism can provide finer control over a precise stroke length. The control unit 418 can communicate with other sensors, computing devices, databases, or other components to determine a desired stroke length for the driving conditions and for an associated tire, in order to adjust these pump parameters. In some instances, the desired stroke length can result in pumps being enabled or disabled. In yet other circumstances, a pump can be installed or removed to provide the stroke lengths desired.

The control unit 418 can adjust other pump parameters as well. For example, the control unit 418 can operate a release mechanism 416 that can release an additional mass 414. The additional mass 414 can attach to mass 402 for a combined larger mass and different pump characteristics. The larger combined mass of the mass 402 and the additional mass 414 may provide more optimal pumping at higher speeds, for example. The release mechanism can recapture and hold in place the additional mass 414 when the control unit 418 determines that the additional mass 414 is not needed. In another variation, the release mechanism 416 can interface directly with the mass 402 and can hold the mass 402 in place when pumping is not necessary, and can release the mass 402 to do pumping work when pumping is desired. In this way, the release mechanism can fix the mass in place if no more pumping is needed to reduce wear. Similarly, a TPMS (Tire-Pressure Monitoring System) can encounter power limitations. For example, the power density can be insufficient to provide accurate tire pressure readings for a desired length of time (for example, 1 year versus a desired 4 years of power). The pumping mechanism can be used to augment the existing power source and/or provide a power source to charge the TPMS power supply when not being used to move air.

The pump 400 can include various sensors, such as an internal sensor 420 and an external sensor 422. The control unit 418 can interface with each of these sensors 420, 422. The internal sensor 420 can detect attributes of the gas in the internal cavity 410. For example, the internal sensor 420 can detect pressure, speed of the air moving in or out of the internal cavity, air temperature, air composition, humidity, pH levels, salinity, air quality, air cleanliness, and so forth. The external sensor 422 can detect similar attributes for external conditions. The internal sensor 420 and/or the external sensor 422 can relay those readings to the control unit 418, which can then base decisions and execute actions based on those readings. For example, if the internal sensor 420 reports air cleanliness that the control unit 418 determines is too low, the control unit 418 can control the outlet valve 408 to shunt the pumped air out back into the atmosphere instead of into the tire or into an air reservoir or tank. Similarly, if the external sensor 420 reports air salinity that the control unit 418 determines is too high and may lead to corrosion damage to the pump or to the tire, the control unit 418 can control the intake valve 406 to prevent air from entering the internal cavity 410. The control unit 418 can further interface with sensors in the tire to determine a type of gas in the tire. For example, the tire may be inflated with normal air, nitrogen, a different gas, or a mixture thereof. The control unit 418 can decide, based on how urgently the tire needs to be inflated and based on the type of gas in the tire already, whether to activate the pump to pump additional air into the tire. In one variation, the control unit 418 can even control the intake valve and outlet valve 408 to reverse their directions so that the pump can actively extract excess pressure from the tire in over-inflation conditions. For example, if the tire is inflated to a desired pressure range at a cold temperature, as the tire moves and heats up, the pressure increases. If the pressure increases, due to temperature or other causes, and thereby exceeds a desired range or threshold, the control unit 418 can actively pump air out of the tire until the pressure reaches the desired range or threshold. Moreover, in some embodiments, the sensors can be used with various filters to improve the condition of the air being pumped into the tire. Such filters may include limiting the number of particulates in the air, the amount of water in the air, or even the amount of nitrogen/oxygen being pumped into the tire. For example, the amount of nitrogen/oxygen being pumped into the tire can be modified to reduce the porosity leakage rate.

The system can divert excess pressure away from the tire when the tire is at an acceptable pressure, or can continue pumping regardless of pressure and use a pressure relief valve to keep the intravolumetric pressure at a prescribed target pressure, in a similar manner to a voltage divider or a water heater pressure relief valve.

A sensor can identify a particular driver, then the system can look up driving characteristics for that particular driver from a database. The database can be populated by observing how drivers behave while driving, or can be populated by explicit information or data provided to the system. Driving characteristics can include how quickly the driver accelerates, how quickly the driver stops, average speeds, acceleration rates, how evenly and how long the driver maintains a given speed, how the driver handles turns or curves, and so forth. The system can also or alternatively identify a driving route or characteristics of a driving route, such as terrain, speeds, frequency of stops, environmental weather or road conditions and so forth, which would affect pump performance and/or the optimal or preferred pressure and/or aid condition for the measured environmental conditions. The system can obtain this information from a navigation device, from a database of routes, or from a route schedule, for example.

Based on the input from one or both of these sources, as well as other data points which affect how the pumps operate, the system can determine a desired range of pump performance. Then, in one embodiment, the system can automatically adjust pump parameters accordingly. For example, the system can adjust the mass in the pump, or the stroke length of the pump, or other parameters. For instance, the system can adjust the mass in the pump to perform better under a particular driver's acceleration characteristics, or can adjust the stroke length of the pump to perform better for a particular terrain. Various parameters of the pumps can be used (and modified) to better take advantage of different driving patterns and conditions. The pump parameters can be adjusted automatically or manually. In one variation, the system proposes or suggests changes to the pump parameters, and a user can accept the proposed changes, or can make the changes manually. Manual adjustment of the pump parameters can be by pressing a button on a digital interface, by adjusting mechanical options on the pumps, or by changing one or more pumps on or in the tires. Alternatively, the tire can have several different sets of pumps, each set having different pump parameters, and the system can engage different sets of pumps for different situations. In another embodiment, different sets of tires include pumps with different purpose-specific pumps installed therein. These different sets of tires can include markings identifying the pump parameters and/or the intended or optimal conditions for using such tires.

As another consideration, the system can automatically adjust pump parameters based on external factors or variables, such as weather, tire age, and so forth. The pump parameters may be set for a higher level of performance than is necessary, which could cause unnecessary wear and tear on the pump or drag. In these cases, the system can adjust the pump parameters to just replenish lost air in the tires, without performing unnecessary work. Similarly, the system can engage various pumps "at will" or on an "as needed" basis, so that the pumps are not actively pumping air until the air pressure in the tires needs to be increased.

The system can, in one embodiment, receive usage data and a tire type for a target tire, and determine, via a processor and based on the usage data, a range of pump parameters that will provide inflation for the target tire according to the tire type. Then the system can adjust a pump fixedly attached to the target tire according to the pump parameters, such that rotational motion of the target tire about an axis causes gravity to move a pump element of the pump in a first direction at a first rotational position to yield a first pump stroke, and causes gravity to move the pump element in a second direction at a second rotational position to yield a second pump stroke, wherein the first pump stroke and the second pump stroke pump a gas into the target tire. The tire usage data can include at least one of driving data, recorded driving patterns, anticipated driving patterns, a driving category, a driving style, a personalized driving profile, a terrain, a maximum speed, how often the tires stop and start rolling, and acceleration data. The system can adjust the pump according to the pump parameters prior to installation on the target tire, at a time of installation on the target tire, or after installation on the target tire. The pump can be adjusted dynamically using, for example, electronic communications to dynamically adjust parameters based on the personal driving patterns for different drivers. The system can adjust the pump by modifying at least one of a mass of the pump element, a stroke length, a direction of the pump, a pump width, pump resistance, or pump position on the target tire, to better take advantage of the personalized driving patterns. The pump element can include a plurality of masses, and the pump can be adjusted by fixing one or more masses of the plurality of masses in place preventing the one or more masses from moving as part of the first pump stroke or the second pump stroke.

Figure 5:
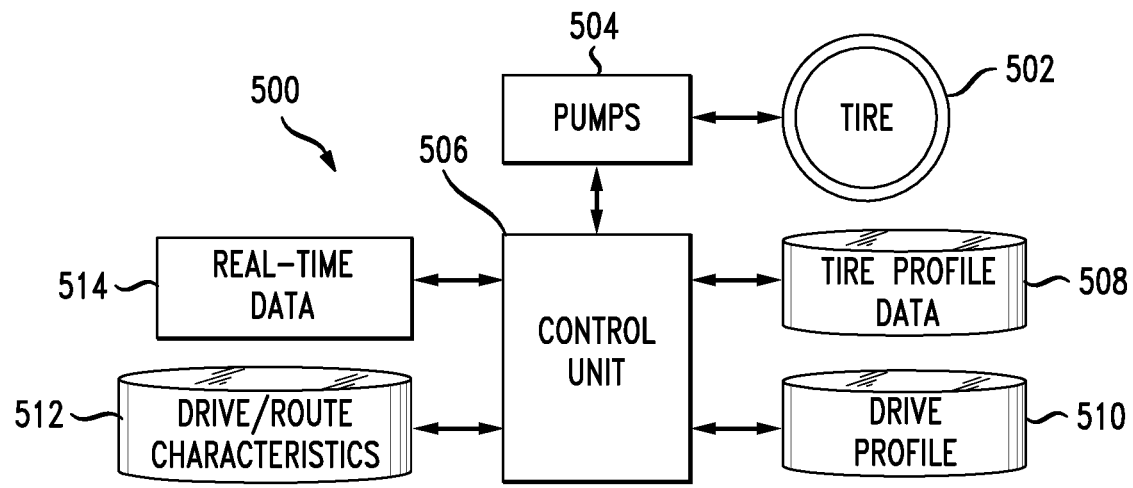
FIG. 5 illustrates example control unit communications with a gravity-driven pump.

FIG. 5 illustrates example communications of the control unit 506 with gravity-driven pumps 504 as well as with other components. The control unit 506 can communicate with multiple different components via wired or wireless communications, or the control unit 506 can integrate all or part of these components in to itself. As discussed above, the control unit 506 can communicate with pumps 504 to control various pump characteristics, as well as to gather analytics data about how the pump is performing, including a number of pump strokes, how often and when the pump strokes occur, how much air is pumped total, and so forth. The control unit 506 can receive real-time data 514 from sensors that monitor the pump, the tire, or other data sources related to the tire or the pump performance. One example of a source of real-time data is a sidewall deformation sensor that provides data from which a load on the tire can be extrapolated or calculated. The control unit 506 can also examine driver and route characteristics 512 to determine how to control the pump, or to report how patterns of driving or which routes influence pump performance. For example, if the control unit 506 is associated with a truck for a bottled water distributor, the characteristics of the route are very different at the beginning of the day when the truck is under full load, as opposed to the drive back to the warehouse when the truck is empty or mostly empty. The control unit 506 can modify the pumps' behavior accordingly so the tires 502 remain inflated within the desired range.

The control unit 506 can identify, from a tire profile database 508, a tire type for the tire 502. The tire data can be stored in a centralized database or be resident on a local device in the tire or in the vehicle or both. The tire type can indicate how fast gas leaks from the tire due to natural porosity of the tire, a range of optimal inflation for that tire type, how temperature affects the tire, how different loads affect the tire, and so forth. The tire profile database 508 can also store data indicating how various tire attributes change over time as the tire ages and/or wears. The control unit 506 can monitor and build up a driver profile 510 or simply use an existing driver profile 510. The driver profile 510 can track driving patterns of an individual user or group of users. The driver profile 510 can include information such as how quickly the driver tends to accelerate from a stopped position, braking times, turn sharpness, and so forth. Each driver drives slightly differently, and the control unit 506 can use that data to determine how or whether to modify pump attributes 504 based on the tire profile data 508 to ensure that the tire 502 remains inflated within the appropriate pressure range. For example, when the driver arrives at the vehicle, the driver's phone can sync with the control unit 506, providing the driver's identity to the control unit 506. The control unit 506 can then use the driver's profile to determine the appropriate pressure range for the tires.

The control unit 506 can communicate with a pressure release valve for the tire which can either relieve pressure from within the tire 502 or can prevent unneeded pump strokes from pumping air into the tire 502, such as by pumping air back into the atmosphere, a separate air container, or elsewhere. Similarly, the control unit 506 can include a locking feature which prevents the pumping mechanism from moving when specific circumstances are detected. The control unit 506 can examine real-time data 514 such as tire pressure and activate all of the pumps 504 for the tire 502 if a sudden pressure drop is detected, for example. If the pumps 504 have been pumping air into a reservoir, the control unit 506 can cause that air to be released into the tire 502 as well. Alternatively, the control unit 506 can only activate specific times and/or when specific conditions have been met. For example, the control unit 506 can be configured to check tire pressure and/or release air pressure into the tire every hour, every five minutes, only when certain conditions are met (i.e., low pressure detected, low temperatures), combinations of conditions are met (i.e., low pressure+sidewall damage), etc.

In one scenario, the optimum or preferred pressure for a given tire under a certain load are "x". If the load of the vehicle were to change (increase or decrease), the preferred pressure would also change to address the different load. The pressure might also need to be changed based on weather conditions, temperature, terrain (paved road versus dirt road), and any other parameter like speed, geography, regulations, etc. Normally, when the tire pressure is insufficient for a given load the side walls of the tire begin to bulge and the tire footprint increases to carry the load. This can include more than the tread, sidewalls, etc., to satisfy the pressure requirement based on force over area. A sensor, such as a piezo-electric strain sensor, in a side wall that can provide data related to distortion of the side wall. The sensor can have its own electricity generator based on a gravity principle. Such data would be an indirect measure of the tire pressure related to the load. If the side walls bulge for a given load, the pressure is likely insufficient for that load and should be increased. However, there is a maximum pressure for each tire which should not be exceeded. Sensors and/or pumps could provide or transmit data to a device, such as a vehicle display or a portable device, for notifying a driver of the pressure issue.

Other data that can be relevant for adjusting the pressure includes receiving operating information from the sidewall, strain gauge deformation, temperature, humidity, PH (Acidity/alkalinity data), oxidation/rust information, air composition, and so forth. Any one or more of these items can be captured and used as a basis for change the tie pressure accordingly. The system may also include accessing the TPMS system for an independent pressure reading and tire location. For example, the front steering tires perhaps should be at a different pressure than rear tires.

The pressure may need to be decreased as well. The system can divert excess pressure from the tire when the tire is at an acceptable pressure or can continue pumping regardless of pressure and use a pressure relief valve to keep the intravolumetric pressure at a prescribed target pressure. This approach would be similar to a voltage divider or a water heater pressure relief valve.

Figure 6:
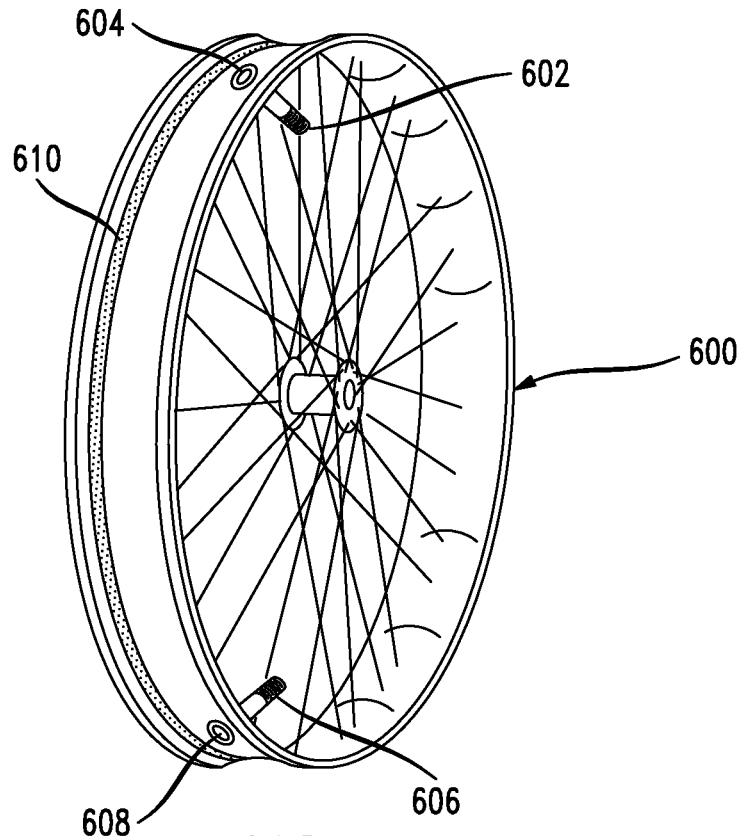
FIG. 6 illustrates an example modified tire rim for receiving gravity-driven pumps.

FIG. 6 illustrates an example modified tire rim 600 for receiving gravity-driven pumps. Rim designs can be modified from the standard approach by including more than one hole for air access. Further, rims can be modified to include a mounting channel to minimize damage to the pumping mechanism when mounting or repairing a tire. In this example, the tire rim 600 is a bicycle rim, but the same principles apply to virtually any inflatable tire, such as tires for consumer cars, busses, heavy construction or mining equipment, motorcycles, scooters, golf carts, and other electric, human-powered, or other-powered vehicles (gasoline, diesel, electric, fuel cell, etc.). These principles can be applied to any rotational motion to which a pump can be affixed to pump air and/or to generate electricity. The tire rim 600 can be modified with multiple stems 602, 606 and corresponding holes 604, 608 in the rim to accommodate pumps. Gravity-driven pumps can be mounted on the interior surface of the rim 600 (or externally) and can be incorporated into or with stems 602, 606 so that a user can inflate the tire in the normal way. In another embodiment, the rim 600 has a channel 610 into which pumps can be inserted. The channel 610 must have holes for the pump to pump in external air, or some other alternate air input.

Figure 7:
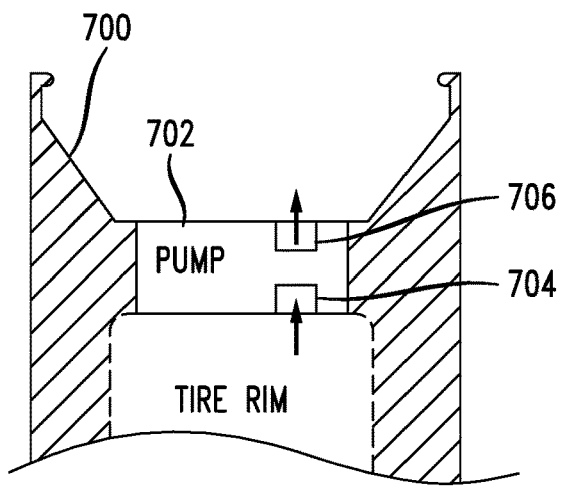
FIG. 7 illustrates an embedded gravity-driven pump in a modified tire rim.

FIG. 7 illustrates an embedded gravity-driven pump 702 in a modified tire rim 700 with a channel 610. In this example, the pump 702 occupies an entire portion of the rim 700, essentially becoming part of the exterior and interior surface of the rim 700, however the pump 702 can alternatively snap into a receiving receptacle that forms all or part of the interior and/or external surface of the rim 700. The air intake valve 704 pulls air in from the atmosphere and the pump pumps air into the tire through the outlet valve 706. In one embodiment, the channel 610 incorporates separate holes for each pump, but in another embodiment, the channel 610 includes a pneumatic system so that multiple pumps work together and feed in to a combined location for pumping air into the tire.

The pumping mechanism can include some kind of visual indication, such as a sticker (such as a state inspection sticker), different color or color pattern, notches, a light, etc., to indicate readily and easily that automatic gravity-driven pumps are included on this rim, or that the rim is capable of receiving and operating with such pumps. The indications can be more detailed visual markings as well, such as text, symbols, or other markings on the tire. The indications can include non-visual components, such as a different texture or material, a vibration generating motor, an audible alert, NFC or RFID tags that electronically and wirelessly confirm the presence of gravity-driven pumps, or that confirm that the tire is capable of receiving and operating with such pumps. These notifications can, where capable, further provide an indication that the pump is functional, such as illuminating a green LED to indicate proper operation, and illuminating a red LED to indicate a failure of some kind. Different blinking patterns can communicate different states of functionality or detected problems. An NFC or RFID tag can communicate additional status or diagnostic information for a pump which can be displayed on a mobile device, such as a tablet or smartphone. Further, the rim and/or the pump mechanism can include markings, notches, bumps, etc. that confirm or guide proper pump mechanism placement, alignment, and/or orientation. Such guides can help reduce the potential to damage the pump or the rim during mounting or repairing procedures. An indication of pumping does not have to be limited to be a visual indicator. The indication could be made via visual, audible and/or haptic indicators. The pump status may also be transmitted wirelessly to a suitable out of rim or tire device. In addition, the pump can send periodic reports indicating functionality, problems, usage, effectiveness, and/or other diagnostic information associated with health and performance of the pump and/or tire.

The rim 600 can be modified to receive a "replacement" pumping mechanism, such as if one pump is damaged or not functioning properly. The pumping mechanism can be popped out, either manually or with a general-purpose tool or a specific tool for removing pumps. Then a user can replace the removed pump with a new pump. The pumping mechanism can be internally mounted, i.e., can be mounted on the outside of the rim facing into the interior of a tire. The pumping mechanism can similarly be externally mounted, i.e., mounted on the inside of the rim facing toward a center of the rim. The pumping mechanisms can be mounted onto the rim at multiple locations which may be different from the locations of any stems for manual inflation. The stem and/or pumping mechanism can exhaust pumped air according to a variable target pressure based on load, as indicated by data from a tire sidewall deformation sensor. The valve and/or stem can act as a Schrader valve, drawing/exhausting air above/below a target pressure.

Figure 8:
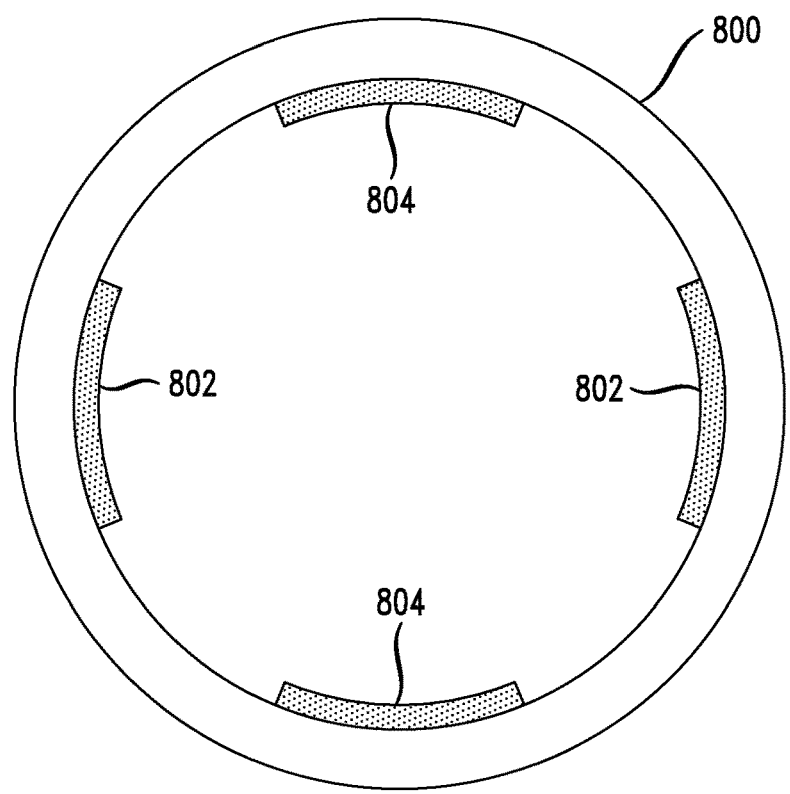
FIG. 8 illustrates an example placement of a heterogeneous gravity-driven pumps on a tire.

FIG. 8 illustrates an example placement of heterogeneous gravity-driven pumps 802, 804 on a tire 800. Different pumps can have different pumping attributes with "sweet spots" tuned to exploit changing driving conditions and provide optimal or preferred performance for a given range of speeds. The different pumps can be placed in such a way that the tire remains harmonically balanced. In this example, pumps of a same type (for example just pumps 802 or just pumps 804) are placed directly opposite each other, because pumps of different types may have different weights or the masses may move in different patterns. However, as long as pumps of the same type are evenly distributed or spaced around the tire, the harmonic balance can be maintained. In other words, the pumps should have an equal angular distance between them. For example, three pumps of a same type can be distributed 120 degrees apart from one another. The control unit can communicate with the different types of pumps, and can activate all pumps collectively, or can activate all pumps of a same type. Other modules can introduce weight at different locations on the tire, which can be offset by placing the pumps in different locations. For example, the pumps can be placed at uneven angular distances from each other to accommodate additional weight from sensors, electronics, tire stems, etc.

Figure 9:
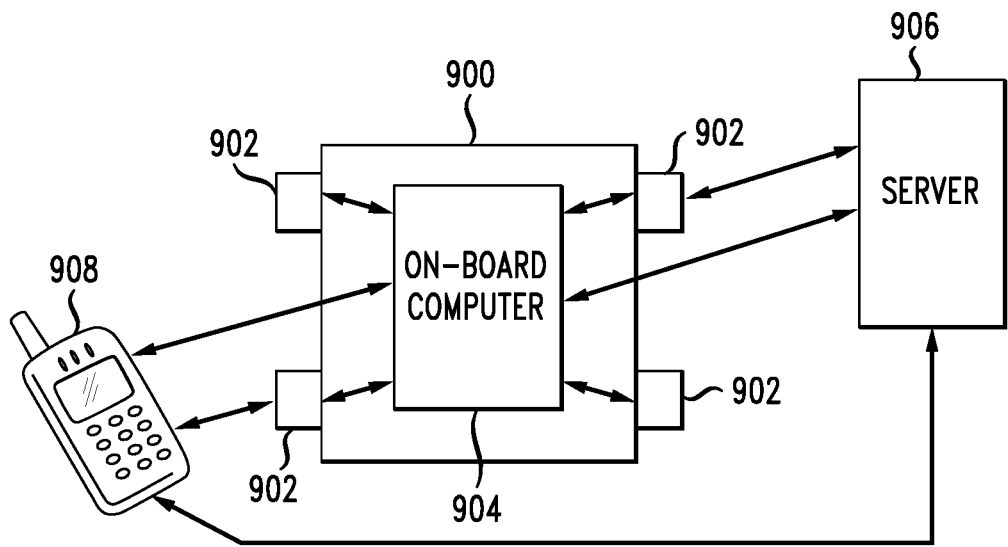
FIG. 9 illustrates an example communication network for gravity-driven pumps with other devices.

In one variation, the control unit can determine that only a small amount of pumping is needed, such as the amount provided by a single pump. But in order to maintain the harmonic balancing due to the moving masses in the pumps, the control unit can activate all of the pumps of a same type, while enabling one pump to pump air into the tire while the remaining pumps simply pump air back into the atmosphere. In this way, the movement of the masses in the pumps offset each other for harmonic balancing, but only one pump is 'working'. In case of pump removal, a specially shaped plug can be inserted into the hole from which the pump was removed to cover the holes and protect the tire, rim, and the hole. This specially-shaped plug could also be required to prevent air losses from rim holes that were not being used FIG. 9 illustrates an example communication network for gravity-driven pumps 902 with other devices. The communication network can be wired, wireless, or a combination thereof. Some parts of the communication network may be active at different times. The pumps 902 can communicate with an on-board computer 904 for a vehicle. The on-board computer 904 can serve as a control unit, or can interface with individual control units for each pump 902. The pumps 902 and/or the on-board computer 904 can communicate with a server 906 to report analytics or performance data for the pumps, the tires, for fuel efficiency, and so forth. The server 906 can then provide a web or other interface for users to view the reported data, and/or manage pumps in the vehicle. Similarly, the pumps 902 and/or the on-board computer 904 can communicate with a mobile device 908 such as a tablet, smartphone, or diagnostic tool. The mobile device 908 can communicate with the pumps 902 and/or the on-board computer 904 via a wired or wireless connection. One example of a wired connection is an OBD-II wired connection. Some examples of wireless connections can include Bluetooth™, Zigbee™, Wi-Fi™, WIMAX™, or RFID. Any of these connections can be bi-directional or uni-directional. The wired or wireless communication may be to a web-based portal, hand-held wireless communication device, or to the vehicle computer system directly (wired via the OBD or a bus) or wirelessly to the bus and/or electrical control module or other suitable vehicle-based computer/storage device The pump mechanisms can incorporate electronic components to receive and transmit wirelessly various data to and from the vehicle, including tire pressure, tire temperature, internal and external air temperature, humidity, side wall deformation, estimated load as a function of pressure and side wall deformation, pH reading as indicator of oxidation (rusting) inside the tire, air quality sensors, barometric pressure, an amount of electricity generated, an amount of air pumped into the tire, and so forth.

In one embodiment for a semi truck, as the semi-truck pulls in to a weigh station, devices or sensors embedded or placed in positions throughout a parking zone can communicate with the individual pumps in the tires and provide a report to an inspector. The report can show, for example, green check marks for tires and pumps functioning properly, and red X's or yellow exclamation marks for tires or pumps that need inspection. The report can provide access for a user to drill down to more detailed information. For example, a user can examine the report to view a history of pump operation, and a chart showing the tire pressure over time to verify that the pump is maintaining the tire pressure within a desired range. This can save significant time and cost at inspections. Such sensors can be placed in other locations as well, or the on-board computer 904 can generate such reports and transmit them to the server 906.

The pumps 902 and on-board computer 904 can be integrated with, or communicate via, the CAN bus or using a CAN protocol. For example, the pumps 902 and on-board computer 904 can communicate with "wireless inspection stations" for vehicle inspections, such as semi trucks at weigh stations, at vehicle service centers, or at government agencies such as the division of motor vehicles for inspections.

Figure 10:
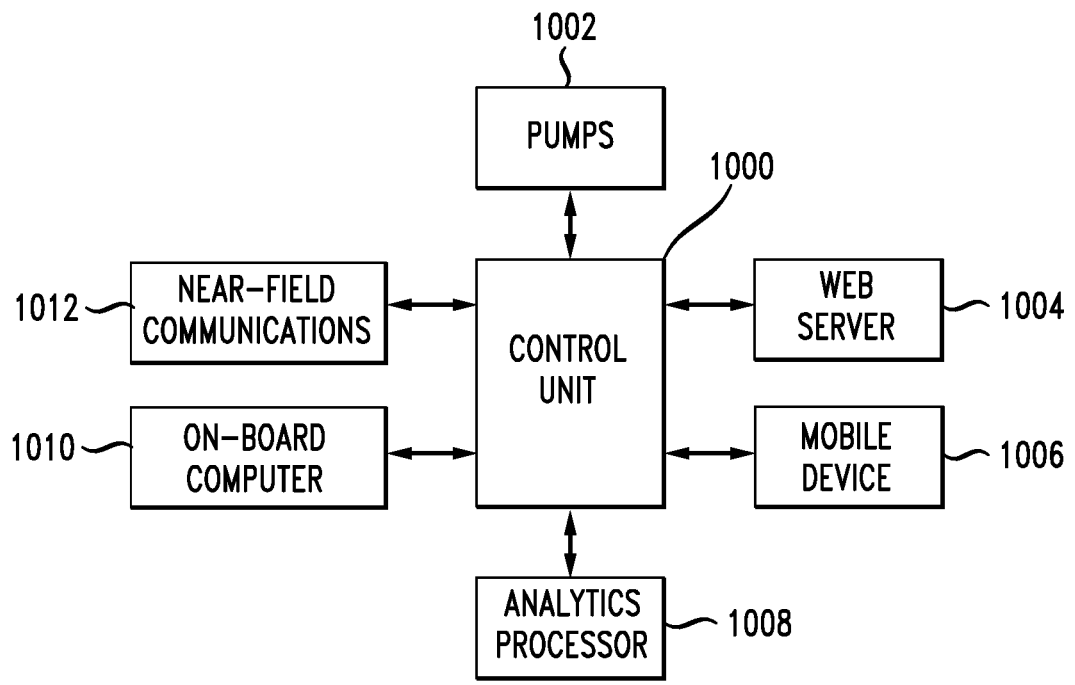
FIG. 10 illustrates example control unit communications with external devices.

FIG. 10 illustrates example control unit 1000 communications with external devices, in a more detailed view of FIG. 9. The control unit 1000 communicates with the pumps 1002, a web server 1004, a mobile device 1006, via a near-field communications (NFC) interface, or with an on-board computer 1010. The control unit 1000 can also communicate with an analytics processor 1008 for determining the appropriate inflation ranges for tires.

Figure 11:
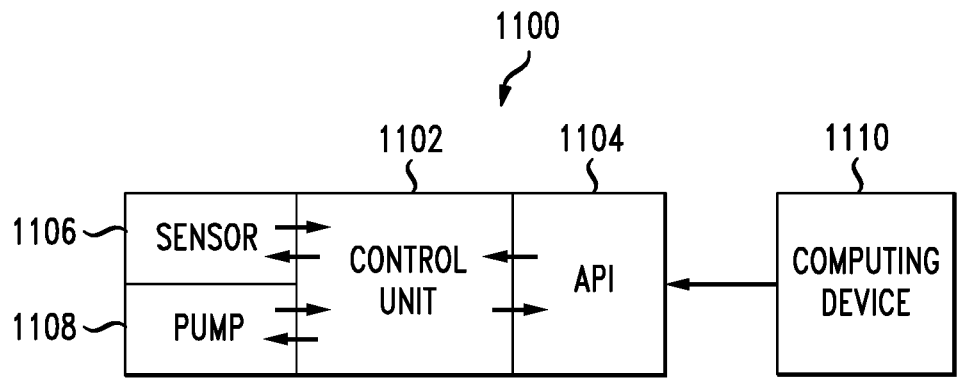
FIG. 11 illustrates an application programming interface (API) for accessing the control unit.

FIG. 11 illustrates an application programming interface (API) 1104 for accessing the control unit 1102. A computing device 1110 accesses the control unit 1102 via an API 1104. The API 1104 can also expose functionality from a sensor 1106 and a pump 1108. The API 1104 can provide a standardized, abstracted way for a computing device to obtain data from or send instructions to any of the underlying components without knowledge or details of how those underlying components operate. For example, the API can define how the computing device 1110 requests a current state of the pump 1108. When the computing device 1110 requests that current state via the API 1104, from the computing device's perspective, inputs are provided, and a corresponding output is returned. The API can be standard regardless of the underlying types of control units 1108, sensors 1106, or pumps 1108. In this way, virtually any computing device 1110 of any type can communicate with and control these components via the API 1104.

Figure 12:
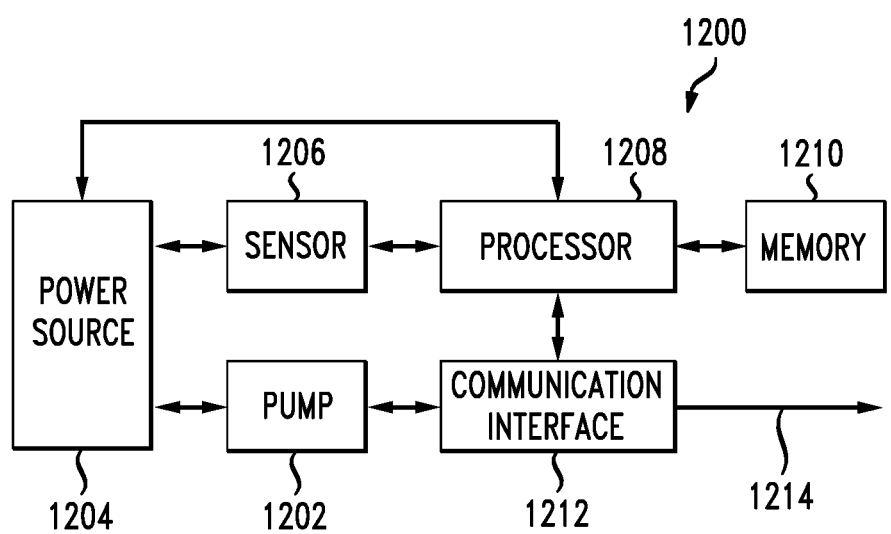
FIG. 12 illustrates an example computing device for controlling and monitoring a gravity-driven pump.

FIG. 12 illustrates an example computing device 1200 for controlling and monitoring a gravity-driven pump 1202. In this example, the pump 1202 can provide power to recharge a power source 1204 such as a capacitor or battery. Alternatively, the power source can be a type of battery or other energy storage device that does not need power from the pump 1202. The power source 1204 can power a sensor 1206, a processor 1208, and a memory 1210. The pump 1202 and the processor 1208 can communicate via a communication interface 1212, and the processor can also communicate with external devices 1214 via the communication interface 1212.

Figure 13:
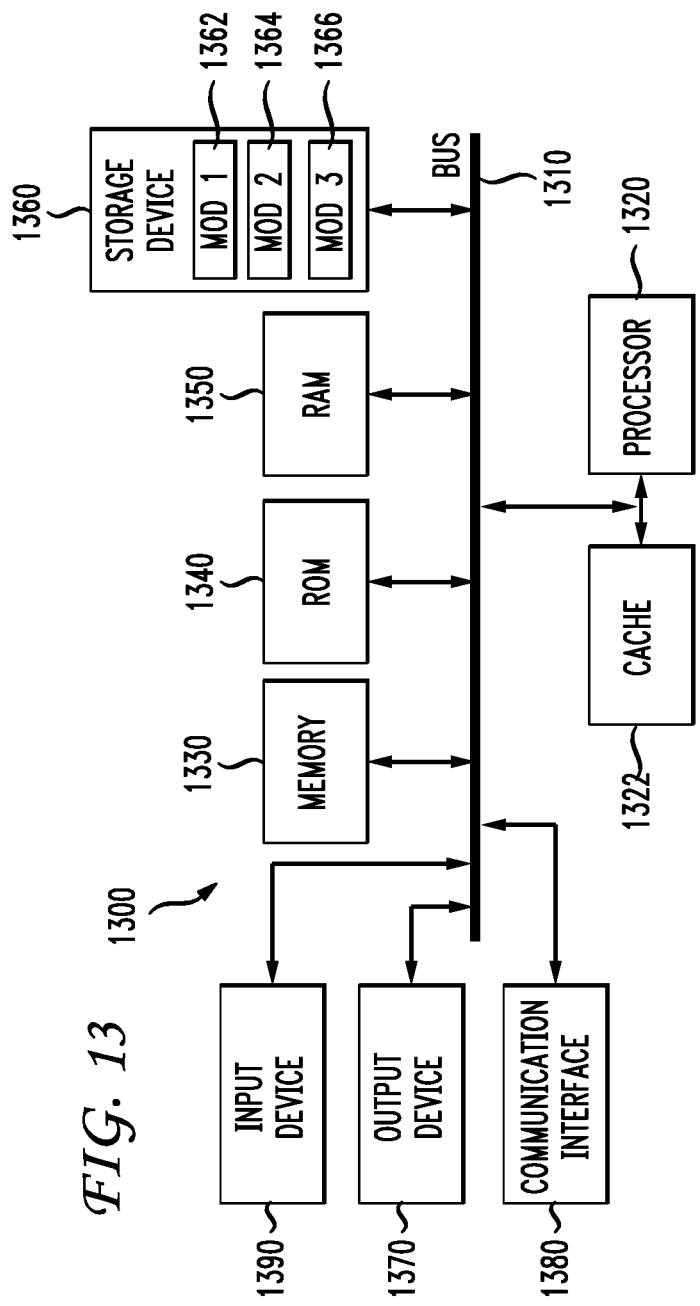
FIG. 13 illustrates an example system embodiment.

A brief description of a basic general purpose system or computing device in FIG. 13 which can be employed to practice the concepts is disclosed herein. With reference to FIG. 13, an exemplary system 1300 includes a general-purpose computing device 1300, including a processing unit (CPU or processor) 1320 and a system bus 1310 that couples various system components including the system memory 1330 such as read only memory (ROM) 1340 and random access memory (RAM) 1350 to the processor 1320. The system 1300 can include a cache 1322 of high speed memory connected directly with, in close proximity to, or integrated as part of the processor 1320. The system 1300 copies data from the memory 1330 and/or the storage device 1360 to the cache 1322 for quick access by the processor 1320. In this way, the cache provides a performance boost that avoids processor 1320 delays while waiting for data. These and other modules can control or be configured to control the processor 1320 to perform various actions. Other system memory 1330 may be available for use as well. The memory 1330 can include multiple different types of memory with different performance characteristics. It can be appreciated that the disclosure may operate on a computing device 1300 with more than one processor 1320 or on a group or cluster of computing devices networked together to provide greater processing capability. The processor 1320 can include any general purpose processor and a hardware module or software module, such as module 13 1362, module 2 1364, and module 3 1366 stored in storage device 1360, configured to control the processor 1320 as well as a special-purpose processor where software instructions are incorporated into the actual processor design. The processor 1320 may essentially be a completely self-contained computing system, containing multiple cores or processors, a bus, memory controller, cache, etc. A multi-core processor may be symmetric or asymmetric.

The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 1300, such as during start-up. The computing device 1300 further includes storage devices 1360 such as a hard disk drive, a magnetic disk drive, an optical disk drive, tape drive or the like. The storage device 1360 can include software modules 1362, 1364, 1366 for controlling the processor 1320. Other hardware or software modules are contemplated. The storage device 1360 is connected to the system bus 1310 by a drive interface. The drives and the associated computer-readable storage media provide non-volatile storage of computer-readable instructions, data structures, program modules and other data for the computing device 1300. In one aspect, a hardware module that performs a particular function includes the software component stored in a tangible computer-readable storage medium in connection with the necessary hardware components, such as the processor 1320, bus 1310, display 1370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1300 is a small, handheld computing device, a desktop computer, or a computer server.

Although the exemplary embodiment described herein employs the hard disk 1360, other types of computer-readable media which can store data that are accessible by a computer, such as magnetic cassettes, flash memory cards, digital versatile disks, cartridges, random access memories (RAMs) 1350, read only memory (ROM) 1340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1300, an input device 1390 represents any number of input mechanisms, such as a microphone for speech, a touch-sensitive screen for gesture or graphical input, keyboard, mouse, motion input, speech and so forth. An output device 1370 can also be one or more of a number of output mechanisms known to those of skill in the art. In some instances, multimodal systems enable a user to provide multiple types of input to communicate with the computing device 1300. The communications interface 1380 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1320. The functions these blocks represent may be provided through the use of either shared or dedicated hardware, including, but not limited to, hardware capable of executing software and hardware, such as a processor 1320, that is purpose-built to operate as an equivalent to software executing on a general purpose processor. For example the functions of one or more processors presented in FIG. 13 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1340 for storing software performing the operations described below, and random access memory (RAM) 1350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1300 shown in FIG. 13 can practice all or part of the recited methods, can be a part of the recited systems, and/or can operate according to instructions in the recited tangible computer-readable storage media. Such logical operations can be implemented as modules configured to control the processor 1320 to perform particular functions according to the programming of the module. For example, FIG. 13 illustrates three modules Mod1 1362, Mod2 1364 and Mod3 1366 which are modules configured to control the processor 1320. These modules may be stored on the storage device 1360 and loaded into RAM 1350 or memory 1330 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 14:
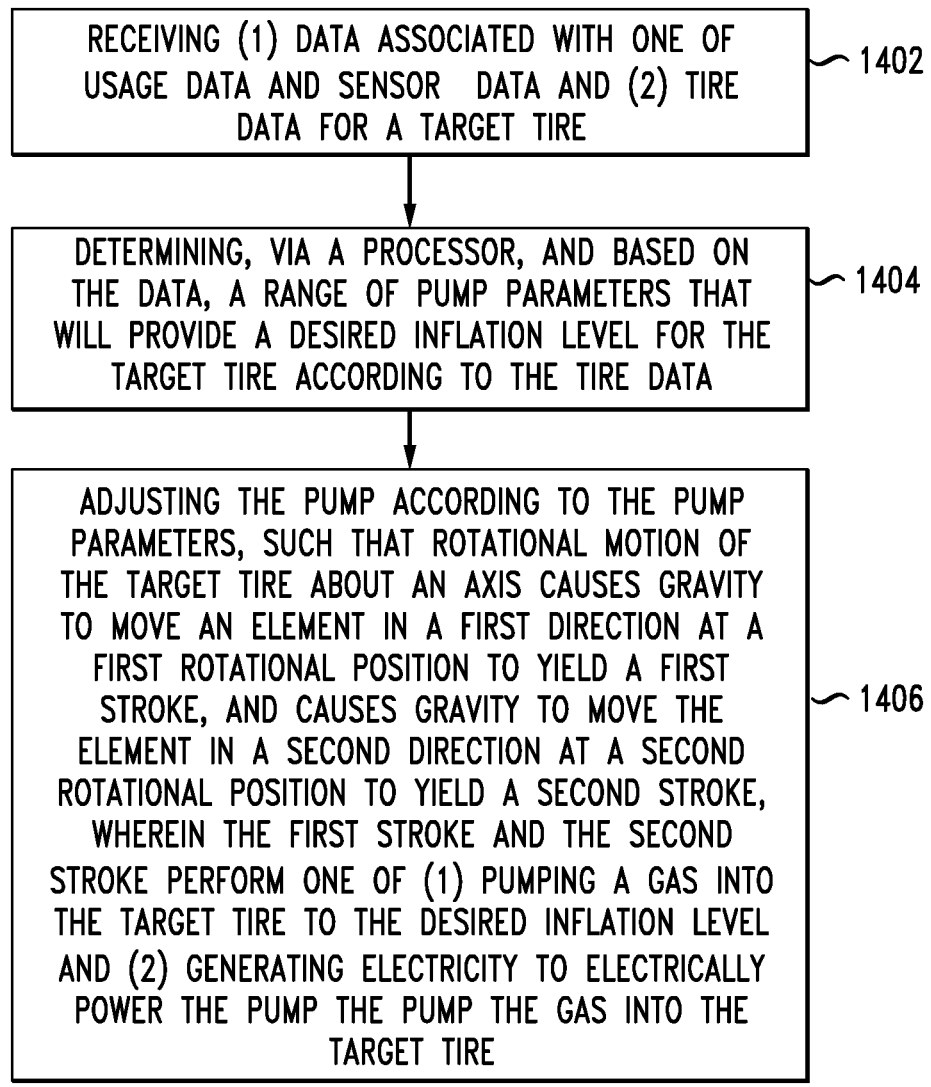
FIG. 14 illustrates an example method embodiment.

Having disclosed some basic system components and concepts, the disclosure now turns to the exemplary method embodiment shown in FIG. 14. For the sake of clarity, the method is described in terms of an exemplary system 100 as shown in FIG. 1 configured to practice the method. The steps outlined herein are exemplary and can be implemented in any combination thereof, including combinations that exclude, add, reorder, or modify certain steps.

As shown in FIG. 14, a method includes receiving (1) data associated with one of usage data and sensor data and (2) tire data for a target tire (1402), determining, via a processor, and based on the data, a range of pump parameters that will provide a desired inflation level for the target tire according to the tire data (1404) and adjusting the pump according to the pump parameters, such that rotational motion of the target tire about an axis causes gravity to move an element in a first direction at a first rotational position to yield a first stroke, and causes gravity to move the element in a second direction at a second rotational position to yield a second stroke, wherein the first stroke and the second stroke perform one of (1) pumping a gas into the target tire to the desired inflation level and (2) generating electricity to electrically power the pump the pump the gas into the target tire (1406).

The method can also include data which is at least one of driving data, recorded driving patterns, anticipated driving patterns, a driving category, a driving style, a personalized driving profile, a terrain, a maximum speed, how often the tires stop and start rolling, and acceleration data. The pump can be adjusted according to the pump parameters prior to installation on the target tire, at a time of installation on the target tire, or after installation on the target tire. The pump can be adjusted dynamically such as when a new load is attached, upon detecting a temperature change, or upon detecting a terrain changes. Updates to conditions or information which can affect a pump adjustment can be provided by sensors in a vehicle associated with the tire or by sensors in the tire itself. Determinations to adjust pressure parameters can likewise be performed via a (local) processor associated with the pump or via a remote processor. Pump parameters can be adjusted to alter the pump performance by modifying at least one of a mass of the pump element, a stroke length, a direction of the pump, a pump width, pump resistance, and/or pump position on the target tire.

The pump can include a plurality of masses (or a plurality of pumps each with a single mass), and wherein the pump is adjusted by fixing one or more masses of the plurality of masses in place preventing the one or more masses from moving as part of the first stroke or the second stroke. The pump can include one of (1) a gravity-based pump that physically moves air based on the rotation of the tire, (2) an electrical pump that generates electricity based on tire rotation and (3) a ferrofluid-based pump that generates electricity.

In another aspect, a system can include a pump fixedly attached to a target tire, a processor and a computer-readable storage medium that stores instructions which, when executed by the processor, cause the processor to perform operations. The operations can be those shown in FIG. 14, for example.

Concepts related to modifying the pump parameters are discussed next. The principal involved is that Gravity Based (GB) devices (pumps or generators) have practical limitations as it relates to a desired tire pressure for a given tire, tire application, and load. It is recognized that the preferred parameters for one application (a private passenger vehicle) may not be adequate for another application (large construction or mining vehicles). Similarly, there may be differences within a set segment of the market private passenger vehicles driven occasionally versus private passenger vehicles with a lot of highway miles.

The objective is to identify the various GB device parameters that can be altered to address specific applications or conditions. The gravitational constant (on earth), practically speaking, is unchanging. Therefore, the pressure that can be created is the product of the cross-sectional area and the force applied (P=F*A); where P=pressure, F=force, and A=area. Depending on the weight of the plunging device and the cross sectional area, there is a given volume of air moved by each stroke length with a maximum pressure according to the relationship P=F*A. It should be appreciated that by adjusting the cross-sectional area, stroke length, and/or applied force, specific pressure and volume requirements can be achieved. The rotational speed of the wheel will determine the time available for gravity to do constructive work.

For a given distance, high average speeds have fewer pump strokes available for gravity to do constructive work. Therefore, in an environment where there are fewer pump strokes available for gravity to do constructive work, it may require more air to be moved (greater cross sectional area and more weight) per each pump stroke. Thus, a long haul truck may spend most of its time at high speeds which prevent the GB pumps or generators to do constructive work. They only might slow down and stop, and the slowly speed up 2 or 3 times a day.

Some industrial tires are several orders of magnitude (>200 times) larger in volume than typical passenger vehicle tires. Consequently, greater weights, cross-sectional areas, and stroke lengths may be used, in concert, to accommodate these larger volumes and operating environmental conditions.

In summary, varying pressures can be achieved by modifying the cross sectional area and/or changing the force (weight) being applied. Varying volumes can be achieved by changing the cross sectional area and/or the stroke length. In some instance whereas the application requires greater volumes (increased cross sectional area and stroke length), maintaining the target pressure may also require increasing the applied force.

Pump performance may be altered by changing one or all of the various pump variables, cross sectional area, stroke length, and force. However, it may be that changing one or more of the pump parameters is insufficient to produce the desired pump performance. It may be that a given application experiences such a broad range of operating or environmental conditions that satisfying the operating range of one single device is not practical or even feasible. In this situation, additional pumps with different operating ranges may be required to adequately provide the desired performance. It may be that the preferred embodiment for a given set of wide or diverse operating, environmental conditions, may require more than one type of gravity based pump (one or more gravity based pneumatic pumps and/or one or more gravity based generators driving electric pumps).

Any modifications made to adjust for various parameters in tire pressure are contemplated as within the scope of this disclosure. Changes such as changing the force being applied, changing the cross sectional area, and/or stroke length in an attempt to create a device suited to a different and specific range of operating conditions. Other changes can include changes to a static device (a device designed to work within a defined set of parameters). For example, there might be a specific weighted system for passenger tires and another set of operating parameters for heavy equipment used in mining environments. This disclosure covers changing one or more of the weight, cross sectional area, stroke length, and so forth, to address specific volume, time, and pressure applications. In the alternative, when using gravity based generators to generate electricity to power an electric pump, the system may need greater pressures, or volumes may require more force (weight), more coils, and/or stronger magnets to create greater voltages and/or currents. Consequently, this disclosure covers changing the force (weight), magnetic force, number of coils, and/or stroke length to address increased power demands of the system.

A system can include the ability to manage which pumps are operational out of a heterogeneous set. For example, assume that a heterogeneous set of pumps includes two gravity-based pumps in which air is moved when the pump element moves. The system could include also two electrical pumps in which the moving element generates electricity which is stored for powering the pump.

An example system includes a tire rim for use in attaching an inflatable tire (or other volumetric container) surrounding the tire rim. A first pump of a first type can be fixedly attached to the tire rim. Rotational motion of the tire rim about an axis causes gravity to move a first pump element of the first pump in a first direction at a first rotational position to yield a first pump stroke, and causes gravity to move the pump element in a second direction at a second rotational position to yield a second pump stroke. The first pump stroke and the second pump stroke pump a gas into the inflatable tire or volume.

A second pump of a second type is fixedly attached to the tire rim. Rotational motion of the tire rim about the axis causes gravity to move a second pump element of the second pump in the first direction at the first rotational position to yield a third pump stroke, and causes gravity to move the second pump element in the second direction at the second rotational position to yield a fourth pump stroke. The third pump stroke and the fourth pump stroke pump a gas into the inflatable tire. The first type and the second type have different pump characteristics.

The different pump characteristics include at least one of weight, pump capacity, rotational threshold for pump activation, or pump stroke length. A control system can be deployed to control which pumps are used to pump air into the volume. The first type can be targeted to activate during a first driving scenario, and the second type can be targeted to activate during a second driving scenario. These different scenarios can be automatically implemented (such as based on speed or load or other parameter) or can be controlled via wireless communication.

The first pump and the second pump can be each aligned with the rotational motion of the tire rim. The inflatable tire can include at least one of a heavy machinery tire, a mass transportation tire, a truck tire, a bicycle tire, a consumer car tire, and a motorcycle tire. The first pump and the second pump can be curved along the rotational motion of the tire rim. In one aspect, the first pump and the second pump are straight, and the first pump and the second pump are perpendicular to a radial line of the tire rim. In another aspect, each of the first pump element and the second pump element is a piston that slides inside a tube.

In another aspect, each of the first pump element and the second pump element is a non-solid mass that presses against a respective diaphragm. The first pump and the second pump can be positioned at equal angular distances from each other. In this manner, the first pump and the second pump can be positioned so that the tire rim and the inflatable tire are rotationally balanced. Such balancing occurs because of the element (pump element or electricity producing element) moves along an axis as the tire rotates and as the tire increases in speed, the element can move to a position that balances the tire. The system can also include a lock configured to prevent one of the first pump or the second pump from pumping gas into the inflatable tire.

It may be that in practical application, the range of a given pump's operational utility is too narrow and for a given range or tire, environmental, and/or load applications more than one pump design is needed. This disclosure covers installing at least one pump with at least one set of operational parameters. (ie. More than one pump design may be installed on a rim, simultaneously).

The system disclosed herein allows for the dynamic adjustment of tire pressure based on the load. According to current tire design, there is an optimum pressure for a given tire based on the load and in some circumstances, the road conditions. Currently, tire pressure is a static condition (ie. the pressure is not deliberately adjusted, dynamically, for load and/or road conditions). The pressure may increase with temperature, but this increase is not regulated, real-time by the tire. New sensors and techniques for measuring the active load are being developed all the time. Axle-based and leaf-spring load sensors, or load sensing tires, among others, can provide load condition to various vehicle based systems that can use the information. Gravity based pumps or gravity based generators may capture and use this information to dynamically change various pumping mechanism parameters to address these changing conditions and/or tire pressure requirements. Pumping mechanisms, such as gravity based pumps and gravity based generators, can make pressure adjustments to their operating parameters, when load information is available, according to the data available.

The operating environment of a tire is changing and that enabling the gravity based pumps the ability to adjust dynamically to the changing operational environment is beneficial. A complement concept that also applies is over inflation or over pressurization of the tires. In that condition, the system maintains pressure by venting excess air and/or pressure through the inflation (Schrader) valve. This disclosure covers at least one component of the gravity based pump or gravity based generator that can change, dynamically, during operation to meet a change in the operational environmental and performance requirements to either release air or pump more air into a container. This dynamic change might be changing the force (weight), the cross sectional area, stroke length, and/or a pressure relief valve (venting Schrader valve).

In another aspect, pumps can include electronic and/or sensors to be more efficient and do more work. Dynamic, gravity based pumps and gravity based generators can require electronics and/or sensor feedback. The purpose of changing pump performance (output) can be the consequence of changing environmental factors and/or the desire to maintain and/or optimize the pressure requirements. Sensor information may also include data regarding environmental conditions external to the tire (temperature, humidity, altitude, etc) or internal to the tire (temperature, humidity, pH, air composition (% O2 vs. % N), etc). The sensor feedback can come from on-vehicle sensors, via the CAN or OBD communications bus (OEM applications), remote sensors mounted on the chassis (OEM or aftermarket load sensors), or imbedded sensors in the tires themselves.

Vehicles continue to add and include new sensors and sensor technologies to the vehicle base and electronic safety complement. Some of the latest sensors include load (vehicle weight) sensors. Some sensors may be on the vehicle, integrated with other vehicle systems, or in the tires themselves. Sensor information may also include data regarding environmental conditions external to the tire (temperature (air density), humidity (water content), altitude (atmospheric pressure), etc. or internal to the tire (temperature (implies air density), humidity (a direct measure of air moisture), pH (implies % oxidation and the potential for tire belt breakdown), air composition (% O2 vs. % N—may facilitate the filtering of normal air to include greater % of N gas)). N gas has better thermal properties, is inert and won't react with the rim or belts within the tire and is a larger molecule so porosity leakage is slower than with air, etc.

These data may be used to optimize pump parameters, internal air quality, internal tire chemistry/condition, and/or tire efficiency. Many of the data that are measured by these sensors may be communicated on the OBD (on board diagnostic) or CAN (control area network) communications bus. Some of those sensor technologies may measure a change in the loading condition of the vehicle or the road condition, thereby indicating a need to change the tire pressure (the vehicle gets heavier or lighter requiring a change in the tire pressure to provide optimum safety, wear, and/or fuel efficiency performance). This disclosure covers using electronics and sensor data as feedback to a gravity based pump and/or gravity based generator to adjust the pump/generator performance (tire pressure) based on changing environmental conditions. Additionally, we claim receiving said sensor data may include sensor data off the OBD or CAN bus.

Figure 15:
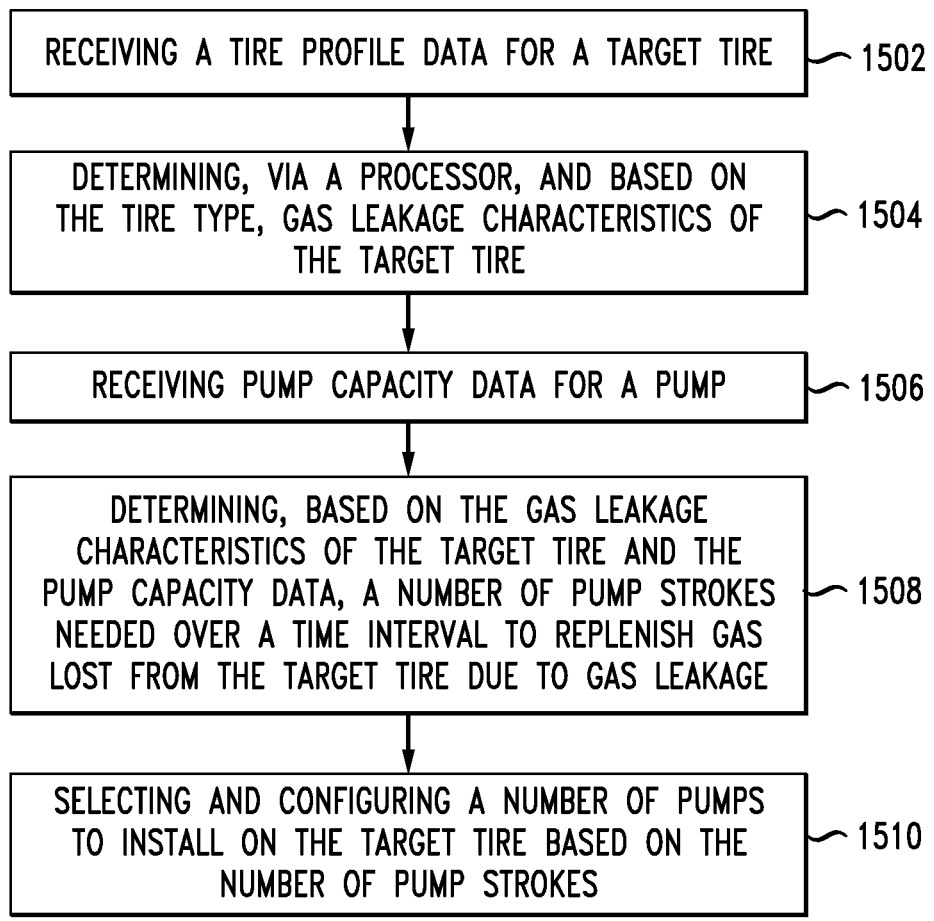
FIG. 15 illustrates another method embodiment.

FIG. 15 illustrates another method embodiment related to determining how many pump strokes might be needed to maintain a desired pressure. A method includes receiving a tire profile data for a target tire (1502) and determining, via a processor, and based on the tire type, gas leakage characteristics of the target tire (1504). The method includes receiving pump capacity data for a pump (1506). When the pump is fixedly attached to the target tire, rotational motion of the target tire about an axis causes gravity to move a pump element of the pump in a first direction at a first rotational position to yield a first pump stroke, and causes gravity to move the pump element in a second direction at a second rotational position to yield a second pump stroke. The first pump stroke and the second pump stroke pump a gas into the target tire.

Next, the method includes determining, based on the gas leakage characteristics of the target tire and the pump capacity data, a number of pump strokes needed over a time interval to replenish gas lost from the target tire due to gas leakage (1508) and selecting and configuring a number of pumps to install on the target tire based on the number of pump strokes (1510).

The tire profile data includes at least one of a tire type, a tire age, expected environmental conditions, expected driving conditions, an existing gas in the target tire, an unloaded weight for the target tire, or a loaded weight for the target tire.

In addition to the method embodiment illustrated in FIG. 15, additional method embodiments within the scope of the invention are now disclosed. For example, to maintain a desired pressure, a system can be configured to operate as follows: receiving a tire profile data for a target tire; determining, via a processor, and based on the tire type, gas leakage characteristics of the target tire; receiving pump capacity data for a pump, wherein when the pump is fixedly attached to the target tire, rotational motion of the target tire about an axis causes gravity to move a pump element of the pump in a first direction at a first rotational position to yield a first pump stroke, and causes gravity to move the pump element in a second direction at a second rotational position to yield a second pump stroke, wherein the first pump stroke and the second pump stroke pump a gas into the target tire; determining, based on the gas leakage characteristics of the target tire and the pump capacity data, a number of pump strokes needed over a time interval to replenish gas lost from the target tire due to gas leakage; and selecting and configuring a number of pumps to install on the target tire based on the number of pump strokes. Systems configured to perform such a method can utilize any of the variations, elements, and embodiments disclosed above.

In another example of a method embodiment configured according to this disclosure, the system can utilize heterogeneous sets of pumps. Such a system can include: a tire rim; an inflatable tire surrounding the tire rim; a first pump of a first type fixedly attached to the tire rim, wherein rotational motion of the tire rim about an axis causes gravity to move a first pump element of the first pump in a first direction at a first rotational position to yield a first pump stroke, and causes gravity to move the pump element in a second direction at a second rotational position to yield a second pump stroke, wherein the first pump stroke and the second pump stroke pump a gas into the inflatable tire; and a second pump of a second type fixedly attached to the tire rim, wherein rotational motion of the tire rim about the axis causes gravity to move a second pump element of the second pump in the first direction at the first rotational position to yield a third pump stroke, and causes gravity to move the second pump element in the second direction at the second rotational position to yield a fourth pump stroke, wherein the third pump stroke and the fourth pump stroke pump a gas into the inflatable tire, wherein the first type and the second type have different pump characteristics. Systems configured to perform such a method can utilize any of the variations, elements, and embodiments disclosed above. For example, the different pump characteristics can include at least one of weight, pump capacity, rotational threshold for pump activation, and/or pump stroke length. In certain instances, the first type can be targeted to activate during a first driving scenario, and the second type is targeted to activate during a second driving scenario. The first pump and the second pump can each be aligned with the rotational motion of the tire rim. Alternatively, the first pump and the second pump can be straight, and the first pump and the second pump can be perpendicular to a radial line of the tire rim.

Such systems can be configured where the first pump element and the second pump element are pistons which slide inside a tube. Alternatively, each of the first pump element and the second pump element can be a non-solid mass that presses against a respective diaphragm. The pumps can be configured such that the first pump and the second pump are positioned at equal angular distances from each other. The first pump and the second pump can also be positioned so that the tire rim and the inflatable tire are rotationally balanced. Such system can also be configured to include a lock which prevents one of the first pump or the second pump from pumping gas into the inflatable tire.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard- wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
receiving (1) first data associated with one of usage data and sensor data and (2) tire data for a target tire;
determining, via a processor, and based on the first data, a pump parameter that will provide a desired inflation level for the target tire according to the tire data; and
adjusting a pump positioned at a distal end of the target tire away from a tire axis and according to the pump parameter, such that rotational motion of the target tire about the tire axis causes gravity to move an element of the pump in a first direction at a first rotational position to yield a first stroke, and causes gravity to move the element in a second direction at a second rotational position to yield a second stroke, wherein the first stroke and the second stroke perform one of (1) pumping a gas into the target tire to the desired inflation level and (2) generating electricity to electrically power the pump the pump the gas into the target tire, wherein the pump comprises a plurality of masses, and wherein the pump is adjusted by fixing one or more masses of the plurality of masses in place preventing the one or more masses from moving as part of the first stroke or the second stroke.

2. The method of claim 1, wherein the first data comprises at least one of driving data, recorded driving patterns, anticipated driving patterns, a driving category, a driving style, a personalized driving profile, a terrain, a maximum speed, how often tires stop and start rolling, and acceleration data.

3. The method of claim 1, wherein the pump is adjusted according to the pump parameter prior to installation on the target tire, at a time of installation on the target tire, or after installation on the target tire.

4. The method of claim 1, wherein the pump is adjusted while the target tire is in motion based on a changed condition, the changed condition comprising one of a change in temperature and a change in terrain.

5. The method of claim 1, wherein the pump parameter is adjusted to alter its performance by modifying at least one of a mass of the element, a stroke length, a direction of the pump, a pump width, pump resistance, or pump position on the target tire.

6. The method of claim 1, wherein the pump comprises one of (1) a gravity-based pump that physically moves air based on rotation of the target tire, (2) an electrical pump that generates electricity based on tire rotation and (3) a ferrofluid-based pump that generates electricity.

7. The method of claim 1, further comprising:
detecting a change in load on the target tire; and
using the change in load when determining the pump parameter.

8. A system comprising:
a pump fixedly attached to a target tire;
a processor; and a computer-readable storage medium that stores instructions which, when executed by the processor, cause the processor to perform operations comprising:

receiving (1) first data associated with one of usage data and sensor data and (2) tire data for a target tire;

determining, based on the first data, a pump parameter that will provide a desired inflation level for the target tire according to the tire data; and adjusting a pump positioned at a distal end of the target tire away from a tire axis and according to the pump parameter, such that rotational motion of the target tire about the tire axis causes gravity to move an element of the pump in a first direction at a first rotational position to yield a first stroke, and causes gravity to move the element in a second direction at a second rotational position to yield a second stroke, wherein the first stroke and the second stroke perform one of (1) pumping a gas into the target tire to the desired inflation level and (2) generating electricity to electrically power the pump the pump the gas into the target tire, wherein the pump comprises a plurality of masses, and wherein the pump is adjusted by fixing one or more masses of the plurality of masses in place preventing the one or more masses from moving as part of the first stroke or the second stroke.

9. The system of claim 8, wherein the first data comprises at least one of driving data, recorded driving patterns, anticipated driving patterns, a driving category, a driving style, a personalized driving profile, a terrain, a maximum speed, how often tires stop and start rolling, and acceleration data.

10. The system of claim 8, wherein the pump is adjusted according to the pump parameter prior to installation on the target tire, at a time of installation on the target tire, or after installation on the target tire.

11. The system of claim 8, wherein the pump is adjusted while the target tire is in motion based on a changed condition, the changed condition comprising one of a change in temperature and a change in terrain.

12. The system of claim 8, wherein the pump parameter is adjusted to alter its performance by modifying at least one of a mass of the element, a stroke length, a direction of the pump, a pump width, pump resistance, or pump position on the target tire.

13. The system of claim 8, wherein the pump comprises one of (1) a gravity-based pump that physically moves air based on rotation of the target tire, (2) an electrical pump that generates electricity based on tire rotation and (3) a ferrofluid-based pump that generates electricity.

14. The system of claim 8, the computer-readable storage medium having additional instructions stored which, when executed by the processor, cause the processor to perform operations comprising:

detecting a change in load on the target tire; and using the change in load when determining the pump parameter.

15. A computer-readable storage device having instructions stored which, when executed by the computing device, cause the computing device to perform operations comprising:

receiving (1) first data associated with one of usage data and sensor data and (2) tire data for a target tire;

determining, based on the first data, a pump parameter that will provide a desired inflation level for the target tire according to the tire data; and adjusting a pump positioned at a distal end of the target tire away from a tire axis and according to the pump parameter, such that rotational motion of the target tire about the tire axis causes gravity to move an element of the pump in a first direction at a first rotational position to yield a first stroke, and causes gravity to move the element in a second direction at a second rotational position to yield a second stroke, wherein the first stroke and the second stroke perform one of (1) pumping a gas into the target tire to the desired inflation level and (2) generating electricity to electrically power the pump the pump the gas into the target tire wherein the pump comprises a plurality of masses, and wherein the pump is adjusted by fixing one or more masses of the plurality of masses in place preventing the one or more masses from moving as part of the first stroke or the second stroke.

16. The computer-readable storage device of claim 15, wherein the first data comprises at least one of driving data, recorded driving patterns, anticipated driving patterns, a driving category, a driving style, a personalized driving profile, a terrain, a maximum speed, how often tires stop and start rolling, and acceleration data.

17. The computer-readable storage device of claim 15, wherein the pump is adjusted according to the pump parameter prior to installation on the target tire, at a time of installation on the target tire, or after installation on the target tire.

18. The computer-readable storage device of claim 15, wherein the pump is adjusted while the target tire is in motion based on a changed condition, the changed condition comprising one of a change in temperature and a change in terrain.

* * * * *